United States Patent
Morgan et al.

(10) Patent No.: US 6,783,345 B2
(45) Date of Patent: Aug. 31, 2004

(54) IN SITU MOLDED THERMAL BARRIERS

(75) Inventors: Michael D. Morgan, Billerica, MA (US); Xiudong Sun, Arlington, MA (US); Laura A. Tennenhouse, Belmont, MA (US); Robert A. Wiercinski, Lincoln, MA (US); Benita Dair, Somerville, MA (US); Antonio J. Aldykiewicz, Jr., Brookline, MA (US); Leon Bablouzian, Framingham, MA (US); Lawrence Shapiro, Mansfield, MA (US); William J. Hurley, Jr., Needham, MA (US)

(73) Assignee: W.R. Grace & Co.-Conn, Columbia, MD (US)

( * ) Notice: Subject to any disclaimer, the term of this patent is extended or adjusted under 35 U.S.C. 154(b) by 66 days.

(21) Appl. No.: 10/151,333

(22) Filed: May 20, 2002

(65) Prior Publication Data

US 2003/0089062 A1 May 15, 2003

Related U.S. Application Data

(63) Continuation-in-part of application No. 09/999,307, filed on Oct. 31, 2001.

(51) Int. Cl.$^7$ ................................................ E04C 2/00

(52) U.S. Cl. ........................ 425/110; 383/41; 383/44; 383/54; 383/80; 383/103; 383/106

(58) Field of Search .............................. 383/38, 41, 44, 383/52, 54, 80, 101, 103, 106; 425/110

(56) References Cited

U.S. PATENT DOCUMENTS

| | | | |
|---|---|---|---|
| 2,252,578 A | 8/1941 | Powell | |
| 2,307,902 A | * 1/1943 | Vogt et al. | 383/106 |
| 2,971,616 A | 2/1961 | Bayley, Jr. | |
| 3,108,404 A | * 10/1963 | Lamb | 425/110 |
| 3,197,119 A | * 7/1965 | Hartig et al. | 383/50 |
| 3,264,165 A | 8/1966 | Stickel | |
| 3,370,780 A | * 2/1968 | Shaw | 383/94 |
| 3,430,842 A | * 3/1969 | Yamaguchi | 383/45 |

(List continued on next page.)

FOREIGN PATENT DOCUMENTS

| | | | | |
|---|---|---|---|---|
| DE | 3644531 A1 | * | 7/1988 | E04B/1/94 |
| EP | 1 180 629 A2 | | 2/2002 | F16L/5/04 |
| JP | 4135607 | | 5/1992 | B01D/25/12 |
| JP | 08004150 A | * | 1/1996 | E04B/1/94 |
| JP | 11117424 | | 4/1999 | E04B/1/94 |
| JP | 11117435 | | 4/1999 | E04B/2/72 |
| JP | 2000014817 | | 1/2000 | A62C/2/00 |
| JP | 2000309990 | | 11/2000 | E04B/1/94 |
| JP | 200254250 | | 2/2002 | E04B/1/94 |
| JP | 200281148 | | 3/2002 | E04B/1/94 |
| JP | 2000297489 | | 10/2002 | E04B/1/94 |
| WO | 88/08790 | | 11/1988 | B32B/18/00 |

OTHER PUBLICATIONS

ASTM, "Standard Test Method for Cyclic Movement and Measuring the Minimum and Maximum Joint Widths of Architectural Joint Systems", Aug. 1998.

ASTM, "Standard Test Method for Fire-Resistive Joint Systems", Sep. 10, 1999.

(List continued on next page.)

*Primary Examiner*—Robert B. Davis
(74) *Attorney, Agent, or Firm*—Craig K. Leon; William L. Baker

(57) ABSTRACT

The invention provides methods, systems, and devices for installing barriers in openings or gaps in or between structures such as walls, ceilings, and floors. At least one barrier molding bag is positioned in the hole or gap, and a flowable firestop material that is preferably operative to cure or harden, such as a hydratable cementitious slurry, is introduced into the bag to create a barrier in the hole or gap.

29 Claims, 13 Drawing Sheets

U.S. PATENT DOCUMENTS

| | | | | |
|---|---|---|---|---|
| 3,854,253 A | | 12/1974 | Slowbe | 52/2 |
| 3,894,682 A | * | 7/1975 | Harmsen | 383/50 |
| 3,918,512 A | | 11/1975 | Kunemon | |
| 4,155,208 A | | 5/1979 | Shanabarger | 52/406 |
| 4,172,345 A | | 10/1979 | Alderman | 52/406 |
| 4,172,915 A | | 10/1979 | Sheptak et al. | 428/69 |
| 4,182,085 A | | 1/1980 | Elson | 52/2 |
| 4,269,890 A | * | 5/1981 | Breitling et al. | 428/71 |
| 4,312,279 A | | 1/1982 | Wilson et al. | 110/346 |
| 4,399,645 A | | 8/1983 | Murphy et al. | 52/743 |
| 4,445,898 A | * | 5/1984 | Jensen | 604/337 |
| 4,566,131 A | * | 1/1986 | Achelpohl | 383/44 |
| 4,583,565 A | | 4/1986 | Cornwall | 137/1 |
| 4,638,829 A | | 1/1987 | Cornwall | 137/75 |
| 4,658,434 A | * | 4/1987 | Murray | 383/66 |
| 4,724,858 A | | 2/1988 | Cornwall | 137/75 |
| 4,871,477 A | | 10/1989 | Dimanshteyn | 252/609 |
| 4,878,481 A | | 11/1989 | Schoeff et al. | 126/307 |
| 4,884,381 A | | 12/1989 | Betti | 52/741 |
| 4,942,050 A | * | 7/1990 | Ylvisaker | 426/394 |
| 4,988,406 A | * | 1/1991 | Nelson | 156/73.6 |
| 5,035,951 A | | 7/1991 | Dimanshteyn | 428/446 |
| 5,076,309 A | | 12/1991 | Cornwall | 137/15 |
| 5,127,203 A | | 7/1992 | Paquette | 52/241 |
| 5,127,425 A | | 7/1992 | Cornwall | 137/1 |
| 5,127,760 A | | 7/1992 | Brady | 403/230 |
| 5,129,201 A | | 7/1992 | Robertson et al. | 52/232 |
| 5,155,957 A | | 10/1992 | Robertson et al. | 52/232 |
| 5,180,063 A | | 1/1993 | Sakno | 206/582 |
| 5,183,070 A | | 2/1993 | Cornwall | 137/75 |
| 5,340,612 A | | 8/1994 | Perito | 427/403 |
| 5,356,446 A | | 10/1994 | Smetana et al. | 52/743 |
| 5,384,188 A | | 1/1995 | Lebold et al. | 428/283 |
| 5,390,465 A | | 2/1995 | Rajecki | 52/741.3 |
| 5,391,347 A | | 2/1995 | Bastide et al. | 419/38 |
| 5,392,558 A | * | 2/1995 | Blomquist | 43/107 |
| 5,401,538 A | | 3/1995 | Perito | 427/403 |
| 5,417,019 A | | 5/1995 | Marshall et al. | 52/232 |
| 5,452,551 A | | 9/1995 | Charland et al. | 52/232 |
| 5,456,050 A | | 10/1995 | Ward | 52/220.8 |
| 5,471,805 A | | 12/1995 | Becker | 52/241 |
| 5,482,686 A | | 1/1996 | Lebold et al. | 422/179 |
| 5,498,080 A | * | 3/1996 | Dalea et al. | 383/120 |
| 5,498,466 A | | 3/1996 | Navarro et al. | 428/408 |
| 5,508,321 A | | 4/1996 | Brebner | 523/179 |
| 5,548,934 A | | 8/1996 | Israolson | 52/220.8 |
| 5,578,671 A | | 11/1996 | Welno | 524/443 |
| 5,634,304 A | | 6/1997 | Sackno | 52/232 |
| 5,655,350 A | | 8/1997 | Patton | 52/742.13 |
| 5,656,117 A | | 8/1997 | Wood et al. | 156/287 |
| 5,702,218 A | | 12/1997 | Onofrio | 411/552 |
| 5,744,199 A | | 4/1998 | Joffre et al. | 427/389 |
| 5,810,478 A | * | 9/1998 | LaFleur | 383/41 |
| 5,887,395 A | | 3/1999 | Navarro et al. | 52/232 |
| 5,898,987 A | | 5/1999 | Onofrio | 29/446 |
| 5,921,041 A | | 7/1999 | Egri, II | 52/241 |
| 6,051,193 A | | 4/2000 | Langer et al. | 422/179 |
| 6,149,304 A | * | 11/2000 | Hamilton et al. | 383/62 |
| 6,161,564 A | | 12/2000 | Cornwall | 137/75 |
| 6,176,053 B1 | | 1/2001 | St. Germain | 52/232 |
| 6,189,277 B1 | | 2/2001 | Boscamp | 52/317 |
| 6,224,835 B1 | | 5/2001 | Langer | 422/179 |
| 2002/0056242 A1 | | 5/2002 | Anderson | 52/220.8 |

OTHER PUBLICATIONS

Underwriters Laboratories Inc. "UL Standard for Safety for Tests for Fire Resistance of Building Joint Systems", Jul. 31, 1998.

Grace Construction Products, "Firestop Specification", prior to Oct. 1, 2001, purportedly.

Grace Construction Products, "Flamesafe 3000 Elastomeric Spray", May, 2000.

Grace Construction Products, "Head of Wall Systems", 2001.

* cited by examiner

US 6,783,345 B2

IN SITU MOLDED THERMAL BARRIERS

This is a continuation-in-part based on U.S. Ser. No. 09/999,307 filed Oct. 31, 2001, pending.

FIELD OF THE INVENTION

The present invention relates to building structures, and more particularly to moldable thermal barriers for "head-of-wall" joint assemblies between top of walls and ceilings, "perimeter" joints between floors and vertical walls, and other joints, gaps, or holes in building structures.

BACKGROUND OF THE INVENTION

Firestops are thermal barrier materials or combinations of materials used for filling gaps and openings such as in the joints between fire-rated walls and/or floors of buildings. For example, firestops can be used in walls or floors to prevent fire and smoke from passing through the gaps or openings required for cables, pipes, ducts, or other conduits. Firestops are also used to fill joint gaps that occur between walls, between a ceiling and the top of a wall ("head-of-wall" joints), and between a floor and vertical wall ("perimeter" joints).

So-called "head-of-wall" joints pose a number of challenges for the fireproofing industry. Walls are increasingly being made of gypsum wallboard affixed to a framework of metal studs capped by a horizontally extending track. Ceilings are increasingly being made by pouring concrete onto fluted steel. Although the distance between the horizontally extending track at the top of the wall is often fixed in relationship to the ceiling, the gypsum wallboards are subject to expansion and contraction due to motion of other building components, ground settling, or other causes.

For such head-of-wall joints, it is known to use mineral wool batt as a thermal resistant firestop material due to its ability to provide for cyclic movements in the wallboard material. The mineral wool is cut into separate sheets that are appropriately sized depending on the specific geometry of the fluted steel ceiling. The sheets need to be stacked and compressed (e.g., a minimum 50%) when packed into the joint gap. In some situations, a fireproofing material is spray-applied into the spaces of the fluted ceiling to supplement the mineral wool in the joint. In either case, the mineral wool approach requires labor and time.

After packing of the mineral wool batt into place above the wall, the construction worker must then spray an elastomeric coating, using a minimum one-eighth inch thickness, against the exposed side surfaces of the compressed mineral wool layers. The coating must overlap a minimum of one half inch onto the ceiling and wall surfaces. Thus, the use of mineral wool batt and elastomeric spray coating provides for the ability of the resultant firestop to accommodate some cyclic movement (compression and extension) in various components such as the gypsum wallboards on either side of the head-of-wall joint.

So-called "perimeter barrier" systems also typically employ mineral wool and elastomeric coating as firestopping material in the joint gaps between floors and the surface of a wall, which could be an interior partition or an external wall. In this case, the mineral wool batt must be packed tightly in the gap, to improve its fire resistance, and so that upon expansion of the gap due to shrinkage of the floor or movement of the wall, the mineral wool does not fall out of the gap and into the floor level below. An elastomeric spray coating is then applied onto the top face of the packed mineral wool batt, but in most cases the bottom of the mineral wool batt is not coated. This is often due to the fact that the wool batt must be accessed from below, requiring that ladders and spray equipment be moved downstairs and set up.

One objective of the present invention is to provide a more convenient and cost-effective method for installing a thermal barrier in intricately shaped openings and joint gaps such as are found in "head-of-wall" joints, "perimeter" joints, and other variously sized and/or intricately shaped gaps or openings such as penetrations through walls. For example, openings having plastic pipes or plastic-coated wires often require an intumescent firestopping material for sealing the space left by the plastic material after it has melted in the fire. Sometimes an intumescent caulk material is inserted into such penetration openings. In the case of larger diameter pipes, a metal collar is used to retain the caulk in place. In other cases, wrapped or bagged mineral wool with an intumscent material is inserted into the hole. In any case, installation of such firestopping is time-consuming and expensive.

Another objective of the invention is to provide novel thermal barriers that may be used conveniently and safely in hard-to-reach building or ship vessel joint gaps or holes. For example, the location of a head-of-wall joint next to an elevator shaft or crawl space would render difficult the installation of mineral wool/coating systems, because the task of coating both sides would be complicated by the lack of convenient access.

A still further objective of the invention is to enhance safety of installation. An applicator must climb up and down ladders on a frequent basis when working on head-of-wall joint assemblies. In the first instance, there is the fitting and hand-packing of mineral wool material into the joint gap. In the second instance, there is the coating of elastomeric material to create a continuous surface between the ceiling, firestop, and wall. In both cases, the ladder may require frequent repositioning, and this is especially the case where joint gaps extend lengthy distances of ten to twenty feet or more. Frequent climbing up and down ladders would also be required in "perimeter barrier" systems if it were desired to apply an elastomeric coating onto the bottom face of a mineral wool firestop that has been packed between a floor and a wall, because the installer would need to go to the floor below the firestop to coat the bottom face of the mineral wool material.

In view of the prior art disadvantages, novel thermal barriers and methods are believed to be needed.

SUMMARY OF THE INVENTION

In surmounting the disadvantages of the prior art, the present invention provides a method and system for installing a thermal barrier in openings and gaps in or between building structures such as walls, ceilings, and floors. In so doing, the present invention provides increased convenience, effectiveness, and safety in comparison to the prior art mineral wool/coating methods. The thermal barriers of the present invention have the ability to conform intimately with the shape of openings and gap spaces of various sizes and shapes. The thermal barriers also have the ability to permit movement of the various building structures around the openings or gaps. In particular, protection on both sides of "head-of-wall" joint assemblies (arising between a wall and ceiling) as well as upper and downward faces of "perimeter barrier" assemblies (arising between a floor and wall) may be conveniently accomplished by the thermal barriers and methods of the present invention.

An exemplary method of the present invention comprises providing a first structure (e.g., building or ship structure such as a floor, wall, or ceiling) having an opening (such as a hole for passage or access to cables, wires, pipes, ducts, electrical panels, etc.), or providing first and second structures which define therebetween a gap (such as the joint gap between a wall and a ceiling or floor); introducing into the opening or gap at least one (empty) thermal barrier molding bag that is operative to receive and substantially to contain a flowable firestop material, one that is preferably operative to harden within the bag; and introducing into the thermal barrier molding bag a flowable firestop material to expand the bag within the hold or joint gap, thereby creating a thermal barrier within the hole or gap.

Exemplary thermal barrier molding bags of the invention are preferably made of thermoplastic film material (although other suitable materials are hereinafter described) and preferably have at least two or more openings, preferably of the type that can be opened and closed more than once, that permit introduction into the bag of a flowable firestop material, e.g., such as hydratable cementitious slurry, an intumescent material, a superabsorbent polymer; polyurethane (foam); hydrated silica gel; inorganic dessicants (e.g., molecular sieves such as zeolites; silica gel; calcium oxide; calcium sulfate; calcium chloride; barium oxide; phosphorous pentoxide); fibers; mineral wool; fiber glass; or mixture thereof. The molding bag material should be sufficiently sized and shaped, and flexible enough to permit expansion of the molding bag, upon introduction of the flowable firestop material, and to permit molding of a thermal barrier within at least a portion of the opening or joint gap. Preferably, the bags are flexible enough to permit them to be transported in a compact rolled form (when empty) and unrolled into place in the opening or gap space (wherein they are expanded and filled with the flowable firestop material).

Firestop barriers made in accordance with the above-described in-situ methods of the present invention provide excellent fire resistance and sealing ability as well as smoke and acoustic barrier properties. They are also sufficiently strong to resist dislodgement from the gap or opening due to pressure (e.g., force from a water hose) and are highly amenable to visual inspection.

Further features and advantages of the invention are described in detail hereinafter.

BRIEF DESCRIPTION OF THE DRAWINGS

The following detailed description of exemplary embodiments may be more readily appreciated in conjunction with appended drawings, wherein.

DETAILED DESCRIPTION OF EXEMPLARY EMBODIMENTS

The present invention employs one or more thermal barrier molding bags that may be conveniently placed in openings in structure, such as a wall, ceiling, or floor, or conveniently placed in gaps such as are defined in the joints between walls, ceilings, and/or floors. The molding bags are placed empty in the hole or gap, and a flowable firestop material is introduced into the molding bag, thereby expanding the bag to fill the space within the hole or gap, and the flowable firestop material is then allowed to harden within the hold or gap to provide a strong thermal barrier. The term "firestop" as used herein is intended generally to refer to materials that are intended to be fire retardant or fireproofing in nature, and a detailed list of exemplary firestop or fireproofing materials is provided in the following paragraphs.

Figure 1:
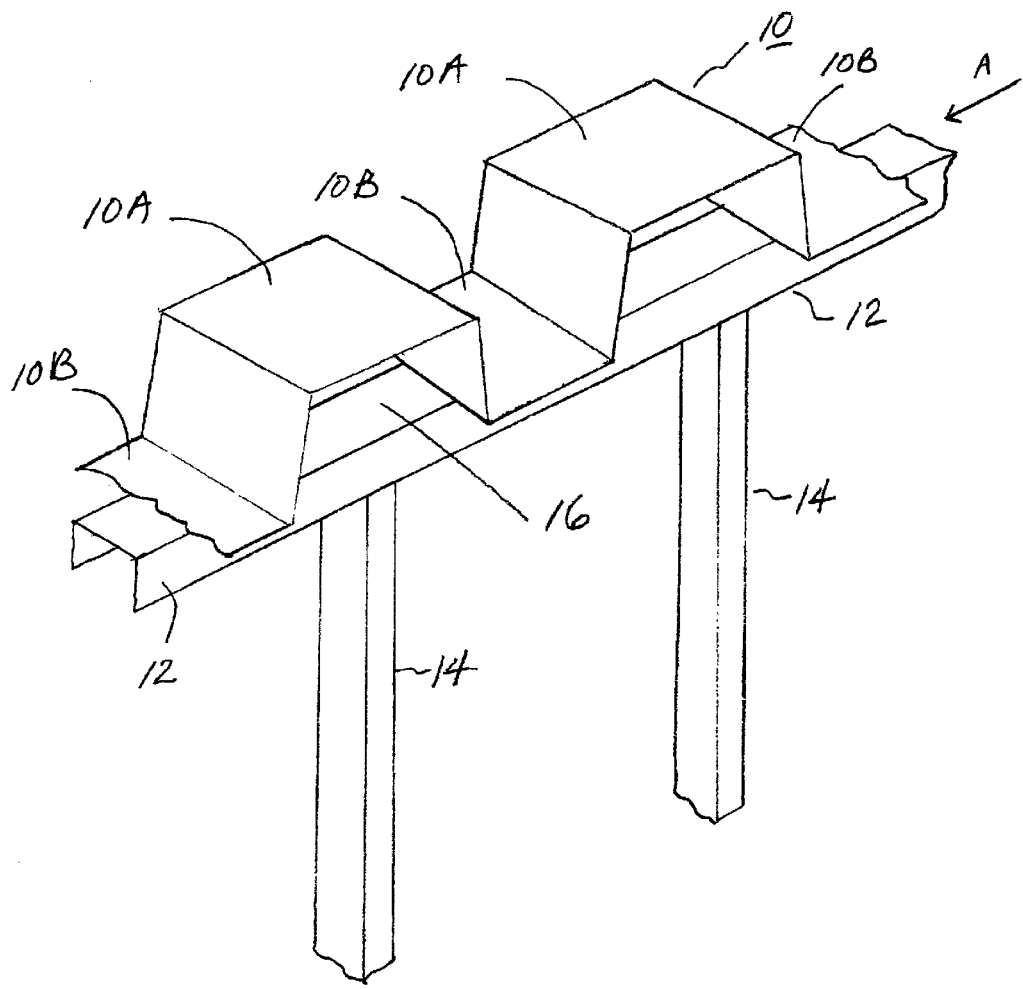
FIG. 1 is a diagram of a PRIOR ART "head-of-wall" joint assembly.
Figure 2:
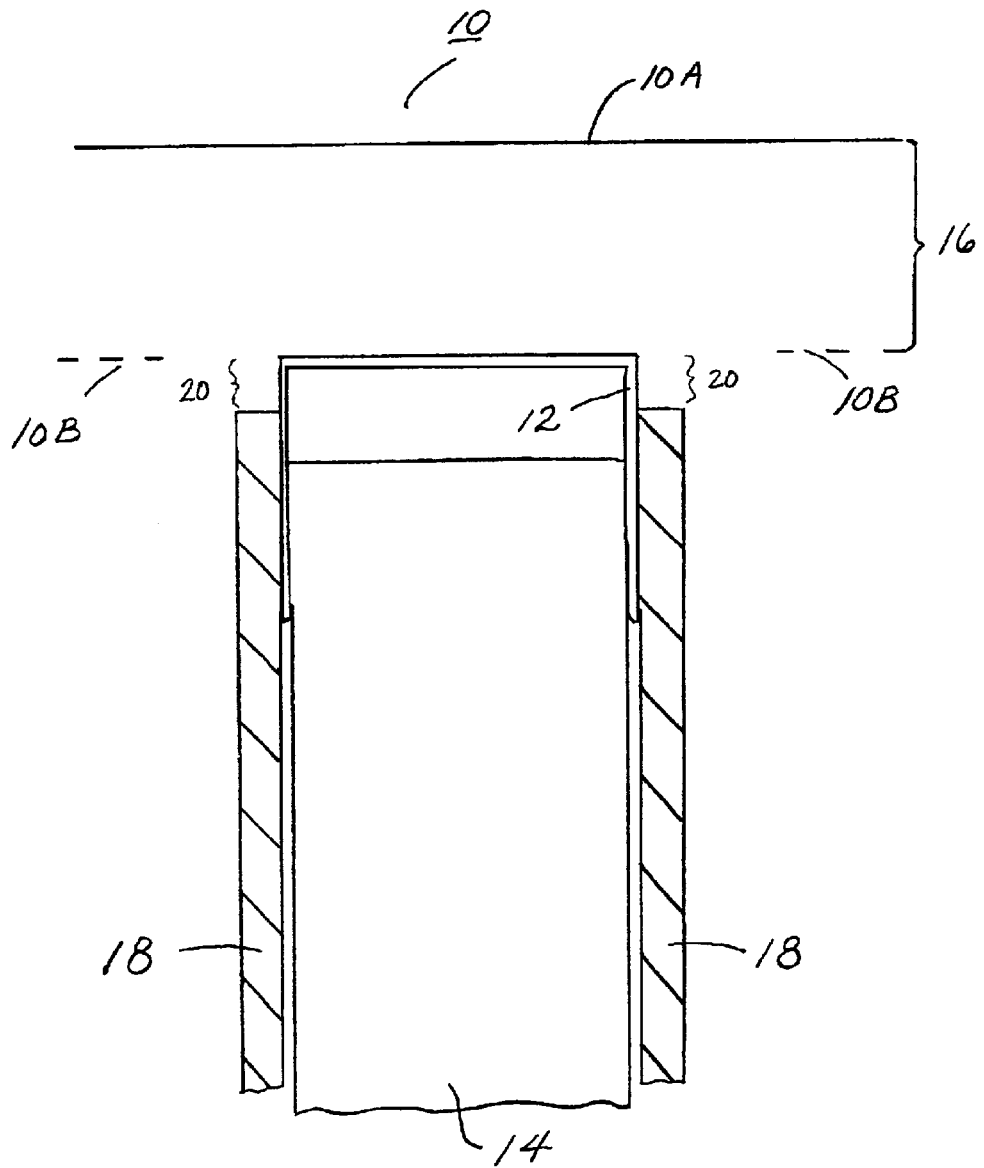
FIG. 2 is another perspective of FIG. 1 (PRIOR ART)

As shown in FIG. 1, a "head-of-wall" joint gap appears between the top of a vertical wall and ceiling (PRIOR ART). In this drawing, the wall is made by attaching a horizontal metal track 12 or runner to a fluted metal ceiling 10 which is shown running in a perpendicular manner to the wall (12). The ceiling 10 has fluted portions 10B which are somewhat lower than the top ceiling portion 10A, and thus a joint cavity 16 is defined between the top ceiling portion 10A and the top of the wall, which in this case is the horizontal track 12. Metal studs 14 are attached to the horizontal track 12 and connected to the floor below. As shown in FIG. 2, gypsum wallboards 18 are affixed on either side of the studs 14 to complete the wall assembly (PRIOR ART), and gaps 20 are typically left between the tops of the gypsum wallboard 18 and horizontal track 12 to permit movement of the wallboards 18.

Figure 3:
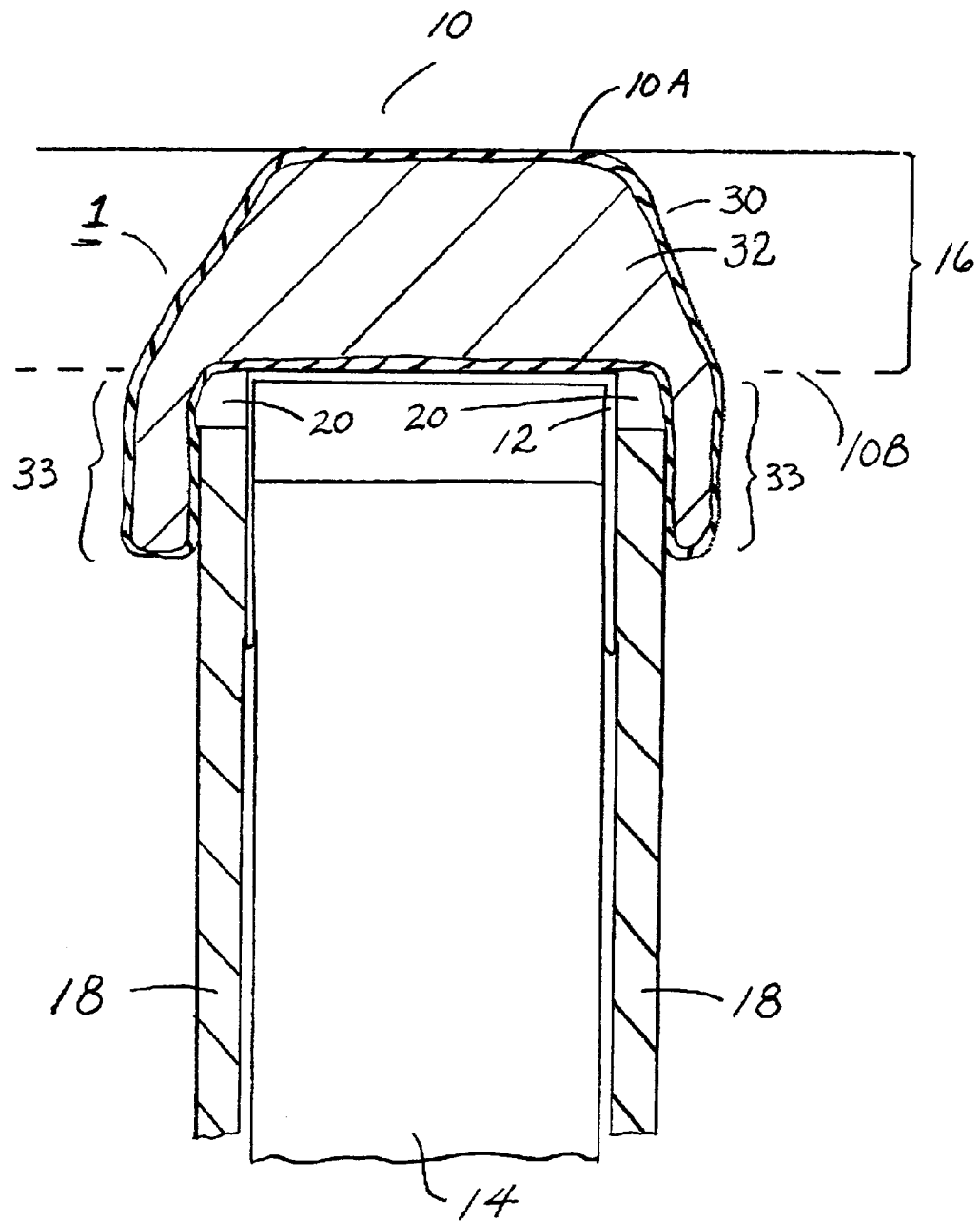
FIGS. 3 and 4 are diagrams of exemplary barriers of the invention.

As shown in FIG. 3, an exemplary thermal barrier 1 of the invention is made by placing or adhering an empty thermal barrier molding bag 30 on top of the horizontal track 12 before the track 12 is attached to or otherwise fixed into place against the ceiling surface 10B. After vertical studs and gypsum boards are installed under the horizontal track 12 to assemble a wall (which in this case is aligned perpendicularly with respect to the orientation of the fluted metal ceiling 10), then flowable firestop material 32 can be introduced into the molding bag 30 to fill the joint space 16 between the fluted metal ceiling 10 and above the assembled wall 14 structure. Preferably, the thermal barrier molding bag 30 has a portion 33 thereof extending below the tops of the gypsum wallboards 18 on either side of the wall (12/14/18) to protect the exposed gap 20 next to the horizontal track 12, so that heat and smoke do not penetrate through the wall at the top portion which is not covered by the gypsum wallboard 18.

Preferably, a spacer material (e.g., resiliently compressible strip of foam (STYROFOAM type), foamed rubber, expanded polystyrene, mineral wool, air balloon, etc.) is inserted at the corner gaps 20, to leave a space for cyclic movement of the wallboards 18 when the flowable firestop material 32 is hardened.

Figure 4:
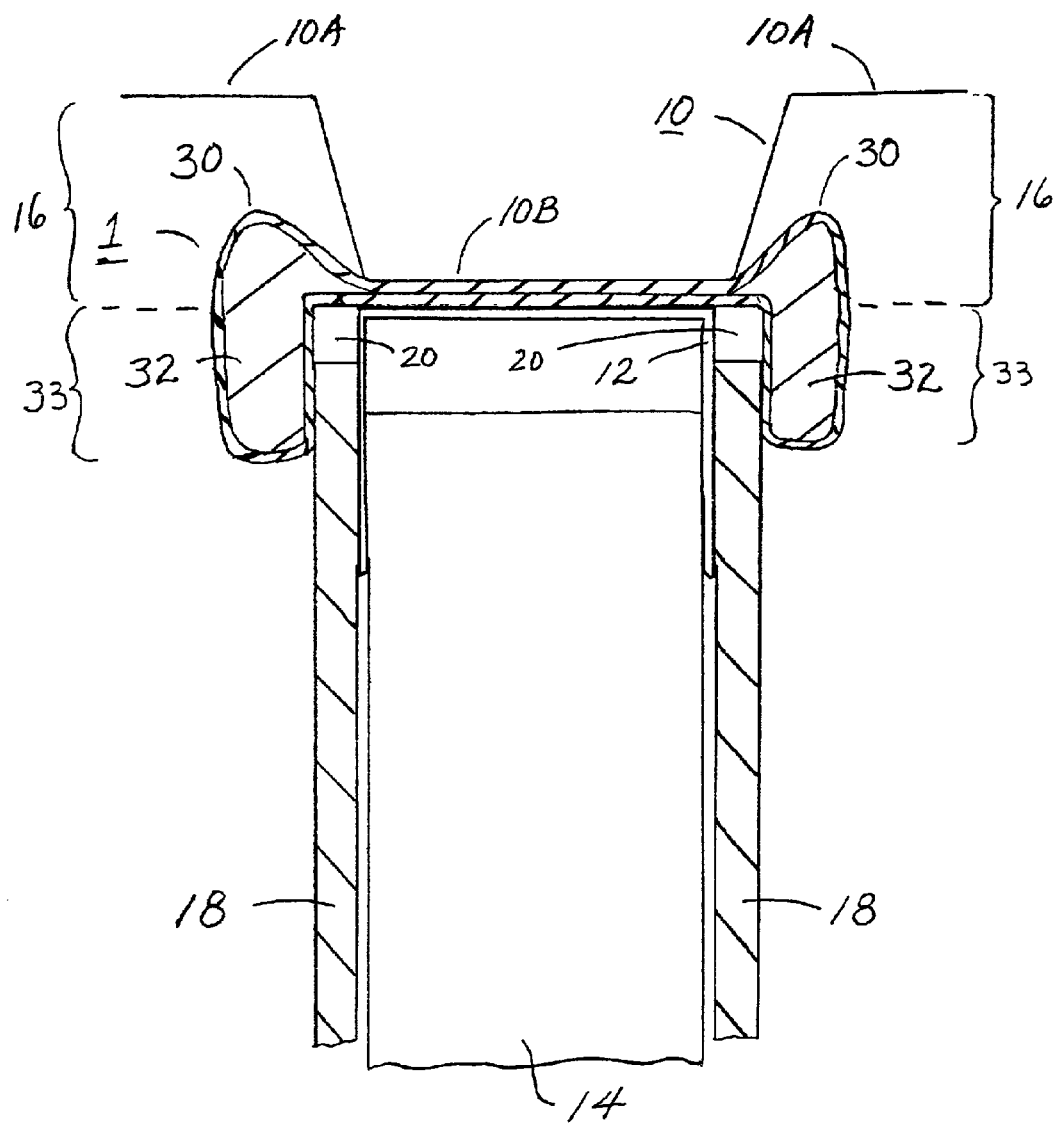

As shown in FIG. 4, another exemplary thermal barrier 1 of the invention can be made when the fluted metal ceiling 10 is oriented in the same direction as the metal stud wall 14. In this case, a barrier molding bag 30 is positioned between the horizontal track member 12 and ceiling surface 10B, with longitudinal edges of the bag (33) extending outwards on either side of the joint between the wall and ceiling, before the horizontal track member 12 is attached to (or otherwise disposed against) the ceiling surface 10B. While no joint cavity therefore appears on top of the wall in this case (because the spaces defined between ceiling surfaces 10A and 10B appear on either side of the wall), the corner gaps 20 which are customarily left at the top of the gypsum wall board 18 nevertheless render the horizontal extending track member 12 unprotected against fire. Therefore, a flowable firestop material 32 is introduced into the molding bag 30, such that a thermal firestop barrier is molded along the joint over the corner gaps 20 at the top of the gypsum boards 18. Again, it is preferable that a spacer material (foam or mineral wool strip) be inserted into the gap spaces 20 to permit movement of the boards 18.

Thus, an exemplary method of the invention comprises inserting a thermal barrier molding bag 30 in the joint between two structures, such as a wall and ceiling, and introducing a flowable firestop material into the bag 30 so as to expand the bag 30 from an empty shape to a shape conforming to the space between or around the two structures, and allowing the firestop material to harden inside the bag 30, whereby a thermal barrier 1 is molded.

The thermal barriers of the invention are contemplated primarily for use in joint assemblies (e.g., floor-to-floor joint systems, wall-to-wall joint systems, floor-to-wall joint systems, and head-of-wall joint systems) as well as in "penetration" holes (e.g., passageways in which pipes, wires, cables, ducts, electrical panels, meters, and other conduits or devices, are situated).

As shown in FIGS. 3 and 4, the positioned molding bag 30 is filled with a flowable firestop material 32 that is operative to harden within the bag 30, such as a hydratable cementitious slurry. The molding bag 30 or bags should allow the introduced flowable firestop material 32 to fill the hole or gap space completely, thereby providing an effective barrier against passage by heat and smoke. Although FIGS. 3 and 4 depict an application for sealing a joint defined between and/or along two structures, it will be understood that the exemplary method and bag device can be used for filing or otherwise protecting variously sized and shaped holes in one structure or the joint gaps between two or more structures. Two or more bags 30 can be used in concert in large holes or joint gaps, such as by overlapping ends of bags, stacking the bags, or abutting two or more bags in an end-to-end configuration.

Exemplary molding bags 30 of the invention may be fabricated as one piece "tubes" or sleeves that may be sealed or otherwise closed at the ends to form a container. More preferably, the bags 30 are made by heat sealing, sewing, adhering, or welding two or more sheets or films together. The films or sheets may be made of different materials. For example, plastic sheets having different moduli of elasticity (Young's) can be used. For example, a highly elastic polymer film can be used for the purpose of allowing the bag to expand into the space of a hole or cavity.

Figure 5:
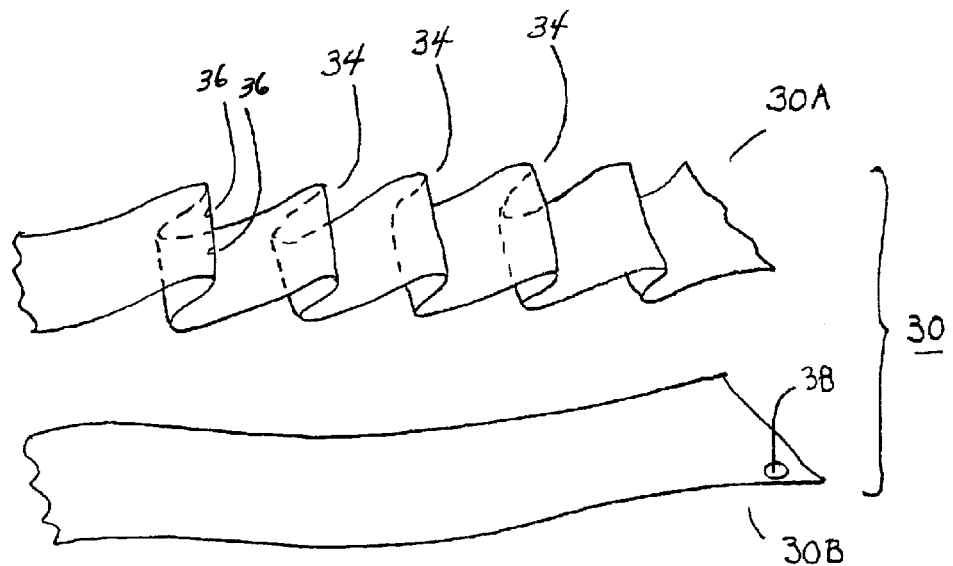
FIG. 5 is a diagram of exemplary components of an exemplary barrier molding bag of the invention having pleats.
Figure 5:
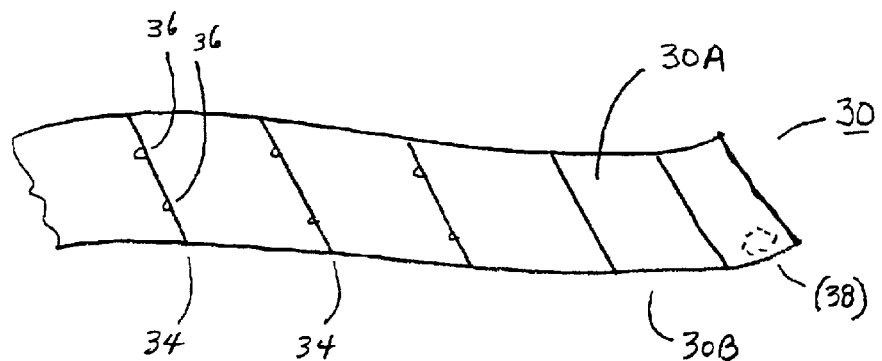

As shown in FIG. 5, another exemplary thermal barrier molding bag 30 of the invention can be made using two separate sheets or films 30A and 30B. The exemplary sheet or film component designated as 30A, which in this case is designed to facilitate expansion of the molding bag 30 into the joint cavities (designated at 16 in FIGS. 1–3), comprises one or more pleats 34 made by folding the material. The folded top sheet or film 30A is then seamed (such as by welding or sewing) to the bottom sheet or film 30B to obtain the molding bag 30. Preferably, the top film 30A has one or more air evacuation holes 36 to permit air to evacuate the bag 30 when flowable firestop material is introduced. An exemplary closeable inlet 38 is illustrated in the top portion of FIG. 5, which is designed to permit the flowable firestop material to be introduced into the bag when the bag is positioned in the hole or joint.

Alternatively, instead of "pleats" (as shown at 34 in FIG. 5) which are a series of substantially uniform folds that extend from one longitudinal edge of the bag to the opposite edge, another exemplary molding bag 30 of the invention can have crimps or crinkles to permit expansion when the bag is filled. The terms "crimps" and "crinkles" are used herein to refer to folds which are substantially irregular in that they are randomly located but preferably aligned generally in one direction. In a manner similar to the series of pleats shown at 34 in FIG. 5, crinkles or crimps may be aligned in a substantially perpendicular direction with respect to the length of the bag 30. Thus, when filled with a flowable firestop material, the exemplary molding bag can expand to fill a "head-of-wall" joint cavity between the wall and fluted metal ceiling (as shown in FIG. 5). It is preferable for the crimps or crinkles to extend from one edge of the bag to another opposed edge, like the series of pleats 34 shown in FIG. 5), although this may not be necessary depending upon the expansion capabilities of the bag desired.

The size and number of pleats or crimps or crinkles per lineal inch of bag length will of course depend on the height or volume of the hole or cavity that is desired to be filled, as well as the width and/or volume of the bag itself. The larger the hole or joint cavity to be filled, the more pleats, crinkles, and/or crimps would be needed in the bag to permit expansion of the bag to fill the hole or joint cavity.

For a "head-of-wall" joint cavity, which is formed between a wall and perpendicularly-oriented fluted metal ceiling (See e.g., FIG. 3), the upper sheet of a bag should have sufficiently sized and/or numbered pleats, crinkles, or crimps to permit the upper surface bag to expand or enlarge, when the bag is filled with firestop material, to 150–250% of its original size.

In a further exemplary embodiment, the molding bags may use pleats, crinkles, or crimps which are attached to elastic strips, in a fashion similar to plastic shower caps that have integral elastic bands for helping to retain a compact shape. For example, one or more elastic strips or bands may be sewn, in a stretched mode, lengthwise to a twenty-foot sheet; when tension is released from the elastic strips or bands, the sheet will shorten in length from twenty feet to ten or twelve feet (depending how much the elastic strip was stretched) whereby the sheet will have pleats, folds, or crinkles which can then expand when the sheet is formed into the molding bag. Preferably, at least two elastic strips are used lengthwise on the upper sheet 30A of the molding bag in a generally parallel fashion with respect to the longitudinally extending edges of the bag.

The function of the elastic is to maintain the molding bag as a relatively compact sheet-like structure, thereby facilitating the positioning of the bag into a hole around a pipe or in a head-of-wall joint cavity (between the horizontal track and fluted metal ceiling), but the elastic material will to permit the pleats, folds, or crimps in the bag material to expand into the hole or joint cavity when the firestop material is pump-flowed into the bag.

As another example, an elastic strip or band can be situated lengthwise perpendicular to the direction of the pleats and/or crimps or cross-wise aligned parallel with the direction of the pleats and/or crimps.

It may be preferable to use a series of pleats rather than smaller crimps or crinkles in plastic sheet materials because the pleats may allow for greater melt-seam strength along the peripheral edges of the bag, as shown in FIG. 5. However, crimps (or crinkles) may provide considerable benefits when used in bags made of paper or crepe paper, such as in the paper tape backing used for making masking tape. Such paper is typically impregnated in an elastomeric latex and crinkled (or crimped) so that it is capable of stretching and conforming to non-flat surfaces. Hence, it is believed that the latex-impregnated and crinkled (or creped) paper used for making masking tape can be used to make sheeting components for molding bags wherein a settable cementitious slurry can be received under pressure, without substantial leakage, and expand by at least 150% of its original length or width to conform within a hole or joint cavity.

In further exemplary embodiments, the bottom sheet or film 30B of the molding bag, as shown in FIG. 5, can be made of material having a higher modulus of elasticity in comparison with the top sheet or film 30A. One reason for using a stronger or more rigid material for the bottom film 30B is that doing so may be more suited for the purposes of attaching one or more closeable inlets 38. Another reason is that the bottom face 30B may be sufficiently rigid to retain a fold or arch around the corner gaps 20 shown in FIGS. 2–4. In further exemplary embodiments, a flashing material, such as a rigid plastic or metal sheet can be adhered to the bottom face 30B when the bag 30 is installed on top of the wall, with corners bent to coincide with the corner gaps 20, thereby to resist the weight of the bag 30 and firestop material 32.

Figure 6:
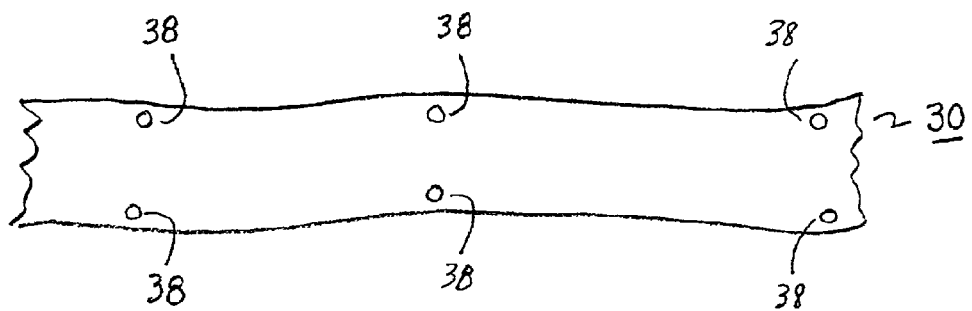
FIG. 6 is a diagram of another exemplary barrier molding bag of the invention having inlets for introducing a flowable firestop material.

As shown in FIG. 6, another exemplary thermal barrier molding bag 30 of the invention has at least two inlets 38 for introducing flowable firestop material into the bag 30 while the bag is situated in a hole or joint. Preferably, the inlets 38 are disposed along both longitudinal edges of the bag 30 (on either top or bottom sheets or films), so that when the bag is installed on top of a wall in a "head-of-wall" joint assembly, an installer can introduce a flowable firestop material into the bag from either side of the wall.

Exemplary flowable firestop or fireproofing materials 32 contemplated for use in the present invention are preferably of the type which are capable of being pumped into the bag 30 and preferably operative to cure or harden inside the bag. The terms "firestop" or "fireproof" may be used interchangeably herein to refer to materials which prevent or minimize the spreading of a fire. The term "flowable" as used herein means and includes both dry and liquid materials, and preferably refers to materials that can be pumped under positive pressure through a hose. For example, dry flowable firestop materials can include fibers, such as mineral wool fibers, expanded vermiculite, expanded perlite, shredded expanded polystyrene, clay granules or prills, and the like, optionally with a binder material, such as a latex, a cement and/or gypsum slurry. Exemplary liquid flowable firestop materials can include hydratable cementitious materials, as further explained below, as well as synthetic polymers (e.g., polyurethane, polyvinyl chloride, polyvinylidene chloride) preferably containing inorganic fillers to reduce flammability (e.g., sand, clay).

The term "hydratable cementitious" material as used herein refers to material that comprises at least one cementitious binder that begins to harden when mixed with water. Such a binder may be Portland cement, masonry cement, or mortar cement, gypsum, stucco, Plaster of Paris, aluminous cement, pozzolanic cement, magnesium oxychloride, magnesium oxysulfate, calcium silicate-hemihydrate, as well as materials such as limestone, hydrated lime, fly ash, blast furnace slag, and silica fume. The hydratable cementitious materials may in addition optionally include fine aggregates (e.g., sand), coarse aggregates (e.g., crushed stone, gravel, carbon flakes), or other fillers. Further exemplary cementitious materials may optionally contain, in addition to the cementitious binder, an intumescent material as will be further described hereinafter.

Preferred cementitious materials include pumpable cement and/or gypsum slurries of the kind now employed in the spray-applied fireproofing industry. Portland cement slurries, optionally having gypsum, are especially preferred. Other suitable fireproofing compositions are disclosed in U.S. Pat. No. 4,699,822 of Shu; U.S. Pat. No. 4,751,024 of Shu; U.S. Pat. No. 4,904,503 of Conroy, Hilton, Korenberg; U.S. Pat. No. 4,934,596 of Driscoll, Hilton; U.S. Pat. No. 5,352,490 of Hilton, Korenberg; U.S. Pat. No. 5,340,612 and U.S. Pat. No. 5,401,538 of Perito; U.S. Pat. No. 5,556,576 of Berneburg, Freitas, Pisaturo; and U.S. Pat. No. 6,162,288 of Kindt, Hilton, Perito. Such cementitious slurries are pumpable, because they are typically used in conventional spray applications, and would permit the thermal barrier molding bags 30 to be filled rapidly. While such formulations may involve the use of fibers, aggregates, and fillers, these would be rendered optional in the present invention because the molding bag 30 would serve primarily as the means for maintaining the integrity and shape of the cementitious slurry until it hardens.

Exemplary hydratable cementitious materials used as flowable firestop materials 32 in the present invention may further include one or more admixtures or additives, such as set accelerators, set retarders, water reducers (including superplasticizers and fluidity enhancing agents), rheology modifiers, air entraining agents, pigments or colorants, porous aggregates (e.g., shredded expanded polystyrene, expanded vermiculite, perlite, etc.), fibers, rheopectic agents (e.g., granular attapulgite, sepiolite, or mixtures thereof), surfactants, and other admixtures as conventionally known in the art.

Exemplary flowable firestop materials 32 may also comprise intumescent compositions which are known in the fireproofing art. Upon exposure to fire, heat, or flames, such intumescent compositions, as their name implies, expand considerably in terms of thickness to produce an insulative layer of char and char foam.

Numerous patents and publications have disclosed intumescent compositions containing one or more polymeric materials in combination with phosphate-containing materials and carbonific or carbon-yielding materials, and such compositions, as known in the art, are believed to be suitable for use as flowable firestop materials 30 of the present invention. See e.g., U.S. Pat. No. 3,513,114 of Hahn et al.; U.S. Pat. No. 5,487,946 of McGinniss et al.; U.S. Pat. No. 5,591,791 of Deogon; U.S. Pat. No. 5,723,515 of Gottfried; World Patent No. WO 94/17142 (PCT/US94/00643) of Buckingham; and World Patent No. WO 98/04639 (PCT/US96/12568) of Janci, all of which are incorporated fully herein by reference. In U.S. Pat. No. 3,513,114 assigned to Monsanto, Hahn et al. disclosed intumescent compositions comprising an aqueous dispersion of a polyvinyl acetate-containing emulsion, a solvent plasticizer, and carbonific ammonium polyphosphates. In U.S. Pat. No. 5,723,515 of Gottfried, it was taught to incorporate an elasticity agent such as vermiculite, perlite, elastomerics, and acrylics, to increase resistance of the intumescent coating to cracking and shrinking and to improve ease of spraying.

Another intumescent composition, suitable as a flowable firestop material 32 in the present invention, is disclosed in World Patent Application of Lawrence L. Kuo et al., PCT/US00/18887. This composition comprises: a component package for providing a char and char foam; a polymeric binder in emulsion form operative to form a film when the composition was allowed to dry; and a crack control agent having a total of 3 to 6 carbons and a boiling point in the range of 75–175° C., the crack control agent being represented by the structural formula $R^2$—O—$CH_2$—C($R^1$)H—O—$R^3$ wherein $R^1$=—H or —$CH_3$; and $R^2$ and $R^3$ independently comprise —H, —$R^4$, or —$COCH_3$, wherein $R^4$ comprises a $C_1$–$C_3$ alkyl group. A preferred crack control agent of Kuo et al. comprises alkoxy glycol ether, alkoxy glycol acetate, alkoxy glycol ether acetate, or mixtures thereof. An exemplary surfactant package comprises a non-ionic alkylaryl polyether alcohol having general formula R—Ø—(OCH$_2$CH$_2$)$_x$OH, wherein R is a $C_4$–$C_8$ alkyl group (most preferably, a branched octyl group), Ø represents a phenylene group, and "x" represents an integer, preferably in the range of 15–100. Preferred surfactant packages may further comprise a dispersant, such as a polyacrylic acid or its salt (e.g., sodium polyacrylate) or derivatives.

Other exemplary intumescent materials include graphite flakes impregnated with sulfuric or nitric acids. Inorganic material flakes capable of exfoliation when heated include vermiculite and perlite.

Intumscent materials can be used in combination with other flowable firestop materials 32 in the invention such as Portland cement and/or gypsum containing slurries. For example, in U.S. Pat. No. 5,395,571 of Symons, there was disclosed a combination involving gypsum and thermoset resin. Thus, a composition can be made by combining (a) an inorganic base material selected from the group consisting of a calcium sulfate hemi-hydrate, magnesium oxychloride, magnesium oxysulphate and a hydraulic cement; (b) a thermosetting resin which is miscible, soluble or dispersible in water; (c) a suitable amount of a catalyst for the thermosetting resin; (d) water in an amount sufficient to rehydrate the inorganic base material with the water present in the other components; (e) optionally a plasticizer such as a melamine formaldehyde condensate; (f) optionally polyvinyl alcohol; (g) optionally a retarder for retarding the setting time of the inorganic base material; (h) optionally a fibrous reinforcing material; and (i) a foam or a foaming agent. Thus, exemplary flowable firestop materials of the invention may comprise a hydraulic cementitious slurry containing a portion (e.g., 1–90%) by weight of a polymer, resin, and/or intumescent material, as generally known in the art.

Exemplary flowable fireproofing materials 32 used in the invention, such as hydratable cementitious slurries, should preferably contain biocidal agents to combat growth of mold, fungi, and bacteria. These may be supplied in dry powder or liquid form. Materials which remain wet for long periods of time may be susceptible to mold growth, and thus mold inhibitors should preferably be incorporated into the flowable fireproofing material especially if it is an aqueous medium such as a cementitious slurry. Effective mold inhibition additives include zinc dimethyldithiocarbamate; 1,3benzenedicarbonitrile; 2,3,5,6-tetrachlorothiabendazole; 5-chloro-2-methyl-4-isothiazolin-3-one and 2-methyl-4-isothiazolin-3-one; 2,3,5,6-1,3-di(hydroxymethyl)-5,5-dimethylhydantion, or diiodomethyl-p-tolyl sulfone. More general biocides, such as sodium hypochlorite or sodium orthophenylphenate tetrahydrate, inhibit bacteria as well as molds. For some applications, it is important to use a biocide with minimal toxicity to humans.

Further exemplary flowable firestop materials 32 may comprise superabsorbent polymers, either alone or in combination with, for example, a hydratable cementitious slurry. A superabsorbent polymer is generally a cross-linked, hydrophilic polymer that is operative to bind water and hence to provide a degree of fire or thermal barrier protection. Examples of superabsorbent materials include hydrolyzed maleic anhydride polymers and copolymers including copolymers with vinyl ethers, styrenes, ethylene, and other olefins, polyvinylpyrrolidone, sulfonated polystyrene, polysulfethyl acrylate, poly(2-hydroxyethylacrylate), polyacrylamide, poly(acrylic acid) and alkali metal salts thereof, poly(acrylic acid alkali metal salt), starch modified polyacrylic acid and alkali metal salts thereof, poly(starch modified acrylic acid alkali metal salt), hydrolyzed polyacrylonitrile and alkali metal salts thereof, poly(hydrolyzed polyacrylonitrile alkali metal salt), poly(vinyl alcohol acrylic acid alkali metal salt), salts thereof and mixtures thereof. Other options for superabsorbent material include poly(acrylic acid alkali metal salt) such as poly(sodium acrylate), polyhydroxyalkyl acrylates and methacrylates, polyvinyl lactams, polyvinyl alcohols, polyoxyalkylenes, natural or synthetically modified polysaccharides, proteins, alginates, xanthum gums, guar gums, and cellulosics. Other examples include monovalent and polyvalent inorganic and organic salts of the foregoing polymers comprising acidic or basic functional groups. Alkali metal salts are preferred for acid functional polymers.

Exemplary molding bags 30 of the invention, as previously mentioned, should be sufficiently flexible to provide for convenience in positioning the bag, when empty, into opening or gaps of various sizes and shapes, and to provide for expandability in size, upon introduction of the hydratable cementitious material, whereby the molding bag conforms to at least a portion, or the entirety, of the joint gap or opening. Preferably, the bag may be shipped in roll form such that it can be unrolled into place conveniently during installation.

The molding bag material should be strong enough to permit filling by a cementitious slurry under pressure and to retain the slurry until it hardens. Since it is the function of the cementitious material, when hardened, to provide a barrier against heat and fire, it is not necessary for the molding bag material itself to be fire-retardant, and it would be expected for the bag material to be burned or even consumed when exposed to fire.

If the molding bag 30 is made of an air-impermeable material such as plastic film, paper, waxed paper, or impregnated woven or nonwoven material (e.g., impregnated spunbonded nonwoven polyolefin such as TYVEK® envelope material) the bag should preferably have one or more air evacuation holes 36 or slits to permit air to escape when the bag 30 is filled with a flowable firestop material 32. The holes should be small enough, however, so that leakage of flowable firestop material 32 is minimal. The holes should be preferably located on an uppermost face (on 30B as shown in FIG. 5 for example) because air will be pushed upwards within the molding bag 30 by the pressure of incoming flowable firestop material 32. While it may be possible to roll the molding bag 30 tightly enough initially to expel the air, the simple act of unrolling the bag is likely to introduce air, thus making it advisable to provide air evacuation holes in the bag. The size of the evacuation holes 36 or slits, as well as their distribution and spacing on the bag, will of course depend on a number of factors, including the nature of the firestop material injected into the bag, the stretching quality of the bag material, and other factors.

Exemplary thermal barrier molding bags 30 may be made from a wide range of materials, such as paper, waxed paper, coated paper, cotton, jute, plastic film, felt, woven fabric, nonwoven fabric (e.g., impregnated spunbonded polyolefin similar to material used in some mailing envelopes), or a combination thereof. Plastic film materials, and in particular thermoplastics such as polyethylene, polypropylene, polyvinyl chloride, polyester, or mixtures thereof, are relatively inexpensive and would be convenient to use for the applications contemplated by the inventors. Preferred bags may be constructed from combinations of nylon and polyethylene (e.g., HDPE, LDPE, LLDPE), such as a polyethylene/nylon/polyethylene layered configuration, which is believed to provide a desirable combination of strength with an ability to form strong heat welded seams. Also, the plastic film material should preferably be completely or partially transparent, to permit installers and inspectors to ascertain visually whether the molding bag has been filled adequately with the flowable firestop material 32.

Other examplary thermal barrier molding bags 30, which are generally elongate in shape for insertion into extended joint gaps, preferably have markings or other indicia to serve as indicators for helping the installer to align placement of the bag within the joint (e.g., the horizontal track 12 on the top of wall). For example, molding bags 30 can have one or more lines extending longitudinally along the bag, such as on the surface which is intended to serve as the bottom of the bag positioned over the horizontal track member 12 of a wall, to serve as guidelines for positioning the bag correctly on top of the wall. Other exemplary bags 30 may have parallel seams or folds or ridges in the bag that correspond with the edges of the top of the wall (which is usually about two to six inches in thickness if made of gypsum board on metal studs, or about eight inches in thickness if made of mortar blocks).

In further exemplary embodiments, a molding bag 30 can be attached, using adhesive or fasteners, to the horizontal track 12 as a one-piece assembly.

Exemplary thermal barrier molding bags 30 may have wall (face) thicknesses ranging from 0.1 mils to 60 mils or greater depending upon the strength of the film or sheet material employed or the number of films or sheets employed. The molding bags may comprise an elongated tube shape that is sealed closed at opposing ends by adhesive, heat sealing, stitching, clamping, tying (using string or wire), or other means known. The bags may be made by folding over a sheet or film and sealing along peripheral edges to obtain a bag enclosure; or the bag can be obtained by sealing together two separate sheets or films to form the bag. Exemplary molding bags 20 of the invention may therefore have a "pillow shape" suitable for filling extended longitudinally within extended joint gaps, such as the "head-of-wall" joint assemblies and "perimeter barrier" assemblies discussed above. Molding bags of the invention may be made from one layer or two or more layers.

Exemplary molding bags 30 may comprise plastic films reinforced with scrim or mesh, similar to bags which are used for containing meat bones. Such bags are well-known in the food packaging industry and are believed to provide increased strength suitable for present purposes. For example, a polypropylene bag can be reinforced with a fiberglass mesh, which decreases the stretchability of the bag.

Figure 7:
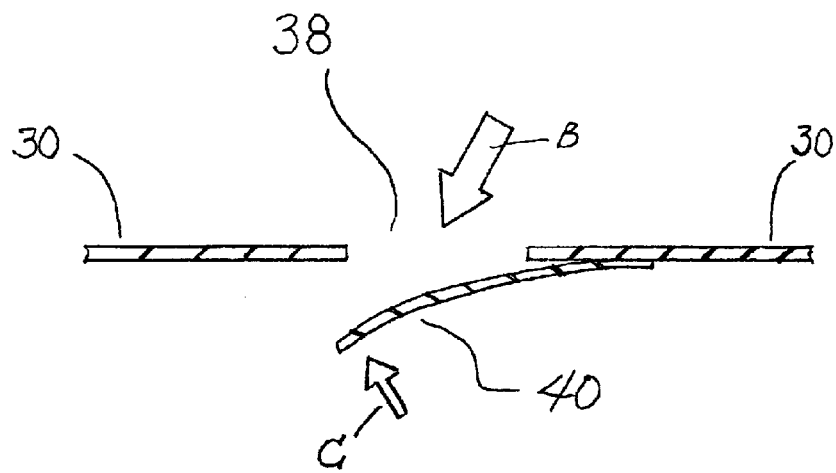
FIG. 7 is a partial diagram of an exemplary inlet for introducing flowable firestop material into a molding bag of the invention.

As shown in FIG. 7, an exemplary inlet 38 employs a flap 40 member that is resiliently biased into a closed position against the opening 39 in the bag material. The flap 40 may, for the purpose of being resiliently biased into a closed position, comprise an elastomer or thermoplastic material, which is partially attached to the inner surface of the bag 30 such as by gluing, hot melt adhesive, sewing, or melt-sealing. The size and shape of the inlet 38 is preferably chosen to correspond with a hose, pipe, or nozzle (not shown) used for conveying a flowable firestop material 32 (e.g., liquid hydratable cementitious slurry) into the bag 30 (shown by the direction of the arrow "B"). In this particular exemplary inlet flap design 28, the pressure of the flowable firestop material 32 in the bag 30 could be used for biasing the flap 40 into a sealing position (shown by the direction of arrow "C") against the inner wall of the molding bag 30. Installers would be able to introduce further flowable firestop material 32 into the bag through the inlet opening 38, and thus the valve 38/40 is preferably closeable, and at least one inlet 38 would be positioned along both longitudinal edges of the molding bag 30, so that when the bag 30 is positioned in correct alignment on top of a vertical wall with both longitudinal edges hanging down on either side of the wall, the inlet openings 38 are conveniently accessible to workers from either side of the wall. In still further exemplary embodiments, the inlet valves 38 can be located towards the center along one or both longitudinally extending edges of the molding bag 30 to minimize the travel distance of flowable firestop material 32 to be introduced into the bag and to increase the likelihood of filling the molding space within the bag as much as possible without leaving air spaces in the hole or joint in which the bag is positioned.

In another exemplary inlet, a screw cap assembly may be employed in a manner similar to the plastic caps on gable-topped orange juice and milk cartons (e.g., waxed cardboard type). It is also possible to employ screw cap assemblies having a directional valve (e.g., rubber flap as shown in FIG. 7). Still further exemplary valves may include ball valves wherein a ball is rotated between a closed position and open position whereby inlet and outlet are connected by a channel running through the ball. Other exemplary valves may include a globe style valve, in which a seal moves to press against a "volcano" style orifice. Further exemplary valves may include check valves, wherein a flap or other occlusion member seated on a base over the inlet orifice may be moved to an open valve position when the flowable firestop material 30 is introduced into the molding bag, and is then moved into a closed valve position by a biasing means, such as a spring, hinge, or connecting member which connects the flap or occlusion member to the base.

Figure 8:
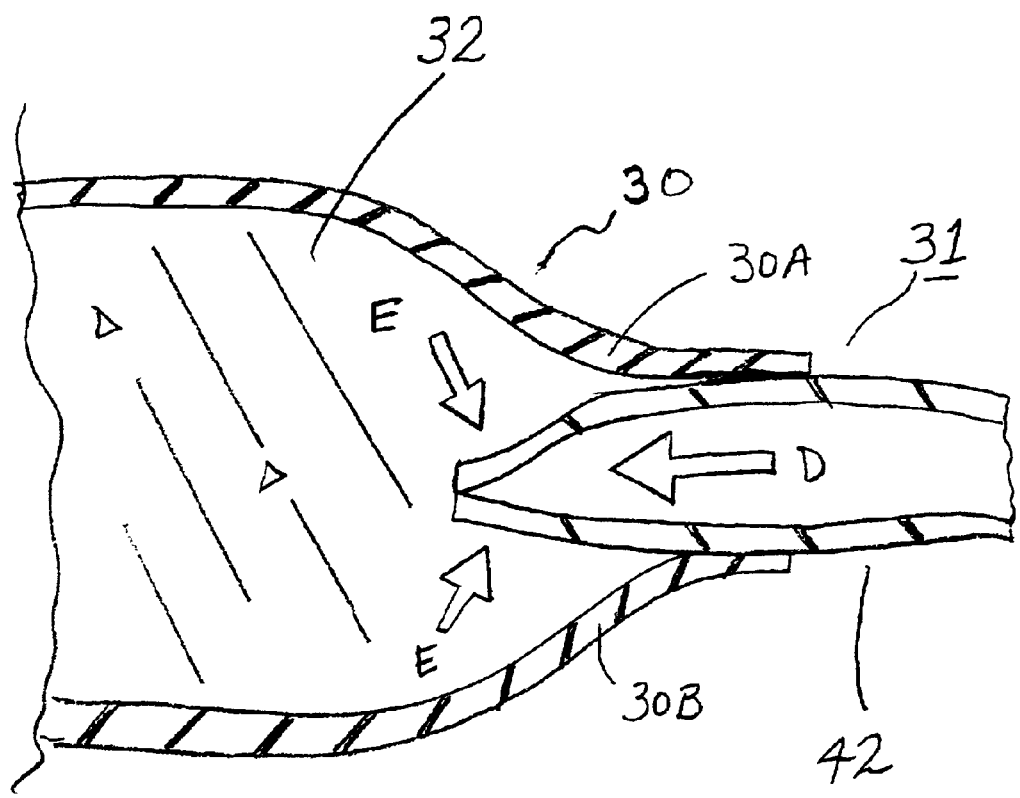
FIG. 8 is a partial diagram of an exemplary tube or sleeve inlet for allowing flowable firestop material to be introduced into a molding bag.

As shown in FIG. 8, exemplary inlet valves may be incorporated as part of the seamed edges 31 of bags 30 (i.e., the seam 31 otherwise joins faces 30A and 30B) in the form of tubes or sleeves 42 which are operative to convey flowable firestop material into the bag 30 (the flow direction of which is indicated by the arrow "D") and also operative to become sealed in a closed position by the pressure of the flowable firestop material within the bag (the pressure exerted by the flowable material 32 to close the valve is indicated by the arrows designated "E"). The tube or sleeve 42 may be connected into the bag 30 at the seam using an adhesive, melt-sealing, or other means known; and may extend for any desirable length outside and beyond the molding bag 30. Using long tubes 42 may provide convenience in high head-of-wall joint assemblies located seven feet or more above floor level, because it would be possible, such as by using extended tubes or sleeves 42 which dangle from bags positioned on the top of the wall, to introduce flowable firestop material 32 into the molding bags without having to ascend a ladder. After filling, the tube or sleeve 42 can be tied or pinched off, reopened, and re-closed using string, rubber band, clip, or other convenient means, below the top of the wall.

Figure 9:
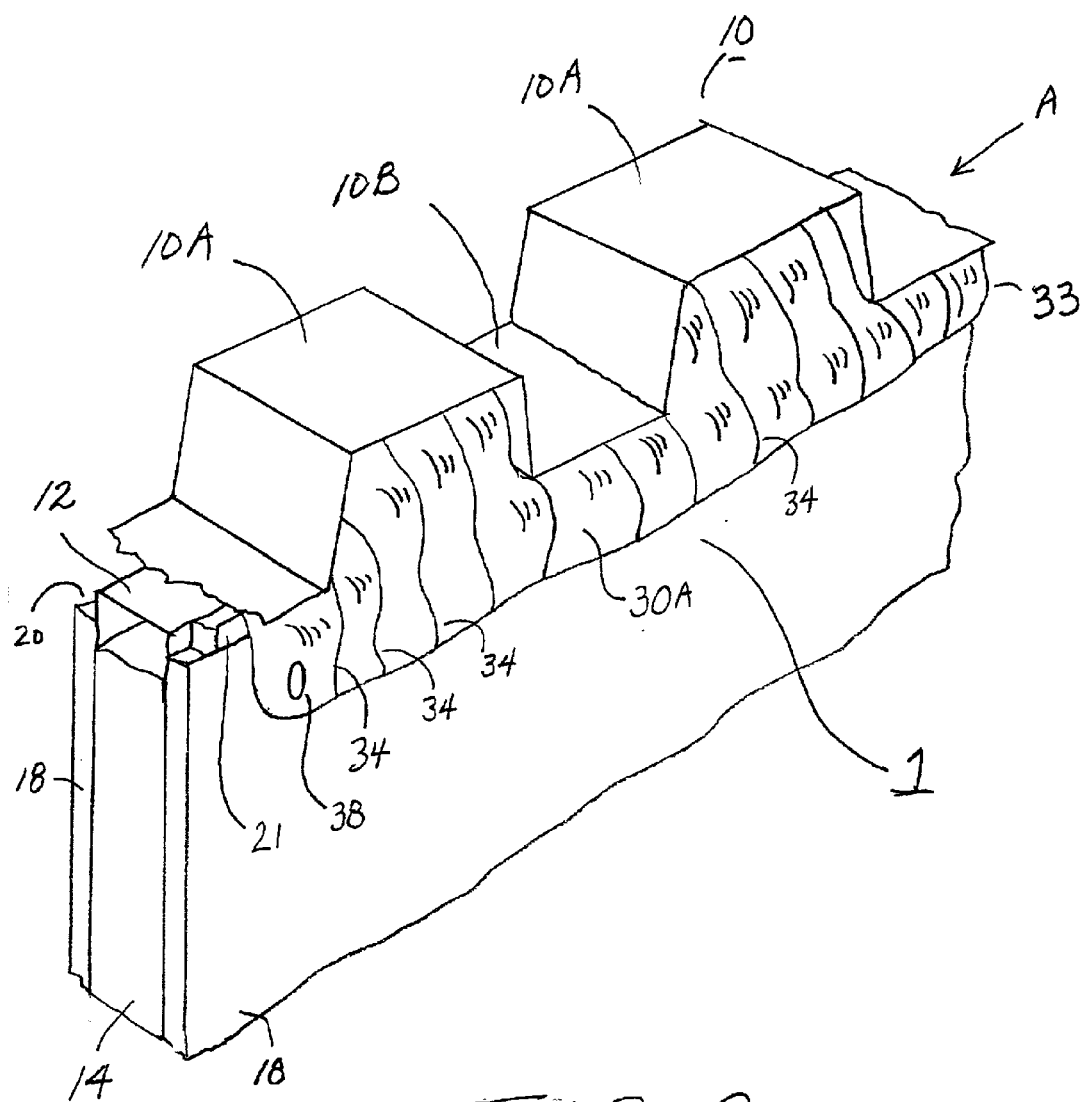
FIG. 9 is a diagram of an exemplary "head-of-wall" barrier assembly.

As shown in FIG. 9, an exemplary thermal barrier 1 of the invention can be used to fill one or more gaps or cavities in the "head-of-wall" joint defined between a fluted metal ceiling 10 and a metal stud assembly. The molding bag is positioned between the horizontal track 12 before the track 12 is fastened to the bottom surfaces 10B of the ceiling 10 (e.g., using screws or other fasteners). The metal studs 14 are then installed between the track 12 and floor (not shown), and one or more gypsum wallboards 18 are attached to one or both sides of the track/stud assembly (12/14/18). Preferably, a spacer strip 21 (e.g., mineral wool or foamed polystyrene or other compressible material) is inserted to protect the gap at the top of the wallboards 18. A flowable firestop material is then introduced into the bag 30 through an inlet 38, preferably located along a longitudinal edge of the bag 30. Preferably, the bag has a series of pleats 34 allowing the bag to expand when filled with the flowable firestop material. The flowable firestop material, under force of pressure, should travel along the longitudinal edges of the bag (designated at 33) which overhang on either side of the wall assembly (12/14/18), and should preferably fill the joint cavities between the top of the wall (12) and uppermost ceiling surface 10A as well as to fill the bag over the corner joints 20 above the wallboards 18.

Figure 10:
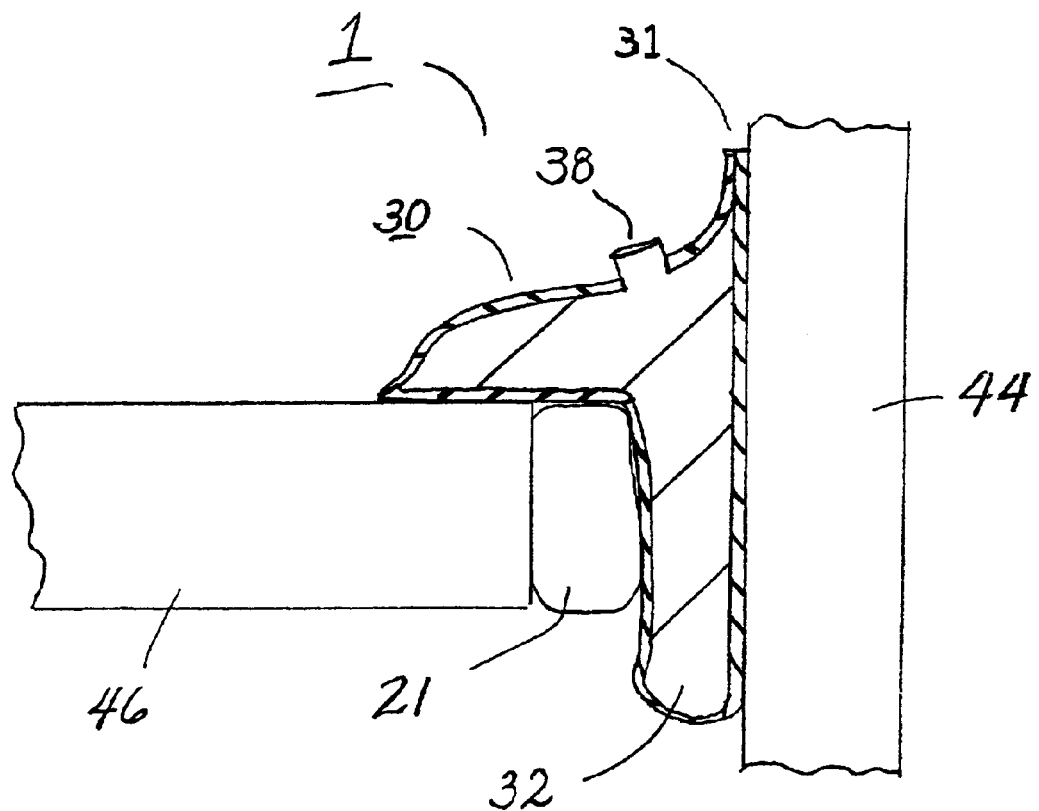
FIG. 10 is a diagram of another exemplary barrier of the invention installed in a joint gap between wall and floor.

As shown in FIG. 10, an exemplary thermal barrier molding bag 30 and method of the invention may be used to install a thermal barrier in a so-called "perimeter assembly" in the joint between a vertical wall 44 and floor 46. In this situation, it is preferable to use a spacer 21 which could be a plastic bag filled with air or a wad or stack of mineral wool, preferably wrapped in a sleeve or envelope, or other resiliently compressible object. The spacer 21 may be adhered or otherwise fastened to the floor 46 using known means. The molding bag 30 may be attached to the wall 44 such as by using nails or screws along the top edge or seam 31 of the bag, using a screw, nail, tack, or adhesive (such as used in structural waterproofing), or other known means. Preferably, the molding bag 30 has one or more inlets 38, such as screw caps, located towards the top of the bag. The inlets 38 may be used also for the purpose of evacuating residual air in the bag during the process of filling it with a flowable fireproofing material 32. Preferably, a portion of the bag extends across the gap between floor 46 and wall 44 and rests on a portion of the floor 46 without being attached or fixed to the floor so as not to impede movement of the floor or wall.

Figure 11:
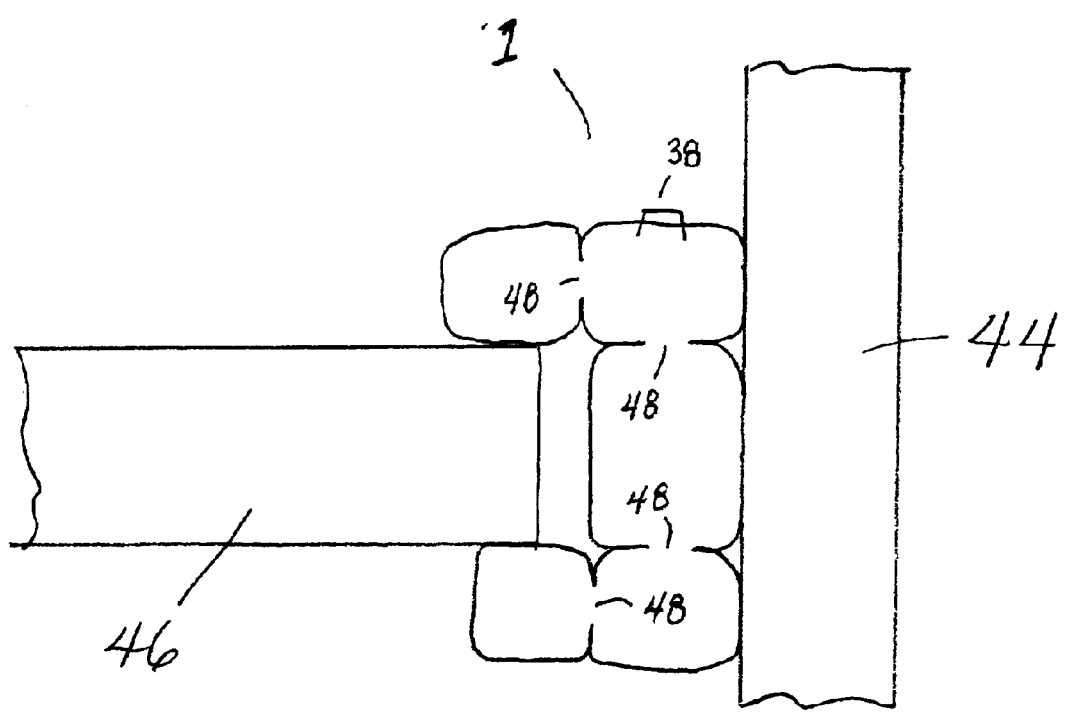
FIG. 11 is another exemplary barrier of the invention.

In further exemplary embodiments of the invention, a thermal barrier molding bag may comprise two or more compartments or, alternatively, comprise two or more bags connected to each other to permit flowable firestop material to be introduced into one bag (or compartment) to flow into a second bag (or compartment). As shown in FIG. 11, an exemplary thermal barrier bag 1 may be comprised of a plurality of bags or compartments extending longitudinally in the perimeter joint between floor and wall (or turned sideways, this could be an illustration of a ceiling and wall). Bag enclosures are connected to each other by a plurality of connecting holes or conduits as designated at 48. For example, plastic tube-like bags could be connected to each other periodically along their length, such as by the use of melt-sealing or grommets, at holes 48 to permit flowable firestop material to flow from one bag enclosure to another. The bag device 20 is preferably attached to the wall 44 adhesively or by mechanical fasteners.

Exemplary thermal barrier molding bags 30 of the invention may optionally have a pressure sensitive adhesive layer, grommets, or other means for allowing the bag to be adhered or mechanically attached to a wall, ceiling, floor, or other building or vessel structure. For example, the bottom side 30B of the bag 30 shown in FIG. 5 can be supplied with a two-sided tape, covered by a releasable sheet, to permit the bag device 30 to be adhered to the horizontal track 12 before it is fastened to or disposed against the ceiling, as illustrated in FIGS. 3 and 4.

In addition to being useful for creating barriers in "head-of-wall" joints and "perimeter barrier" joints, the thermal barriers and methods of the invention may be used with good advantage in protecting "penetration" openings, such as "annular" spaces in which cables, ducts, pipes, wires, or electrical panels are situated. An exemplary method of the invention comprises providing an opening in a building structure (e.g., wall, floor, or ceiling) having a cable, duct, pipe, wire, or electrical panel in said opening and defining an annular or otherwise partially occluded space within said opening; inserting into said space a thermal barrier molding bag; and introducing into said molding bag a flowable firestop material, such as described above. Consequently, the bag inflates and forms a seal within the opening to provide a barrier to both sides of the wall, ceiling, or floor opening. In cases wherein the conduit or electrical panel is not physically in contact with the surrounding wall, ceiling, or floor, then the space in the opening surrounding the conduit or electrical panel is completely annular (i.e., it surrounds the conduit), and this annular space can be filled, for example, by wrapping a molding bag at least once around the conduit. If the conduit is a plastic pipe or plastic covered wire or cable, it is preferable to use an intumescent material in the molding bag or outside of the bag but surrounding the conduit, such that if the conduit (e.g., plastic pipe, cable jacket) melts during the fire, then the intumscent material can expand under the effect of heat to fill the space left by the melted plastic.

When installed in the hole or joint gap of a building structure, the in-situ molded thermal barriers of the invention are tightly conformed to the shape of the structure or structures surrounding/defining the hole or joint gap. It is envisioned that preferred thermal barriers of the invention, when installed in joint assemblies, are capable of passing fire endurance tests and hose stream tests in accordance with the "UL Standard for Safety for Tests for Fire Resistance of Building Joint Systems, UL 2079," Third Edition, Dated Jul. 31, 1988, (Underwriters Laboratories, Inc., Northbrook, Ill.), incorporated fully herein by reference. Fire endurance testing pursuant to UL2079 involves exposing a sample portion of a joint assembly in a test furnace. More accurately speaking, the joint assembly is sealed against the furnace with an insulating gasket between the joint assembly and the furnace (UL 2079). The representative joint assembly can be, for example, a thermal barrier installed in a head-of-wall joint having one or more gypsum boards on either side of metal studs to simulate a wall (typically 2.5–8 inches or more in total thickness) and fluted metal plate to simulate a ceiling deck (as described above). One side of the thermal barrier in the joint would be exposed to heat of the furnace in accordance with a standard time-temperature curve (ASTM E119). This time-temperature curve has characteristic points, as follows:

50–90 degrees F. (10–32 degrees C.) at 0 minutes
1000 degrees F. (538 degrees C.) at 5 minutes
1300 degrees F. (704 degrees C.) at 10 minutes
1550 degrees F. (843 degrees C.) at 30 minutes
1700 degrees F. (927 degrees C.) at 1 hour
1850 degrees F. (1010 degrees C.) at 2 hours One or more thermocouples are installed against the thermal barrier on its "cool" side (i.e., unexposed side of joint opposite to that which is exposed to furnace), and the temperature of the thermocouple is monitored. The test is then conducted until failure is observed. Failure can be detected by holding a cotton waste pad (100 by 100 by 19 mm) directly over the observed crack or hole in the joint system, approximately 25 mm from the breached surface, for a period of 30 seconds. If the cotton ignites (glows or flames) within this period, then integrity failure has been reached. In the alternative, failure is said to be attained when the temperature of the thermocouple has risen by at least 325 degrees Fahrenheit above the starting temperature. Accordingly, exemplary thermal barriers of the present invention (made in situ, or, in other words, in the joint gap) have the ability to resist failure, for a minimum period of at least 60 minutes, and preferably for at least 120 minutes, when tested pursuant to the above-summarized fire endurance test in accordance with UL 2079.

Other preferred exemplary thermal barriers of the invention should have the ability to maintain barrier integrity when subjected to the hose stream test, which is also described in UL 2079. For example, a head-of-wall joint system is subjected to the above-described fire endurance test for a period of time not more than sixty (60) minutes, and then within ten (10) minutes thereafter the joint assembly is subjected to a stream of water delivered through a 2.5 inch (64 mm) hose and discharged through a National Standard playpipe of corresponding size equipped with a 1⅛ inch (29 mm) discharge tip of the standard-taper, smooth-bore pattern without a shoulder at the orifice. The water pressure and duration of the application is to be specified in the table below:

TABLE 1

(Pressure and Duration of Hose Stream Test)

| Hourly fire rating time, minutes | Water pressure at base of nozzle, Psi | (kPa) | Duration of application, seconds per square foot (s/m²) of exposed area[a] | |
|---|---|---|---|---|
| 240 · time < 480 | 45 | (310) | 3.0 | (32) |
| 120 · time < 240 | 30 | (210) | 1.5 | (16) |
| 90 · time < 120 | 30 | (210) | 0.90 | (9.7) |
| time < 90 | 30 | (210) | 0.60 | (6.5) |

[a]The rectangular area of the structure in which the joint system is mounted is to be considered as the exposed area, as the hose stream must traverse this calculated area during application.

Accordingly, preferred thermal barriers of the invention (made in the joint gap), subsequent to application of the aforementioned fire endurance test, should be able to pass the hose stream test, in accordance with UL 2079. In other words, the thermal barriers should demonstrate the ability to resist dislodgement from the joint gap by water pressure from a hose, for a given period of time, as indicated above in the chart with respect to the applicable hourly fire rating time. The nozzle orifice is to be 20 feet (6.1 m) from the center of the exposed surface of the joint system if the nozzle is so located that, when directed at the center, its axis is normal to the surface of the joint system. If the nozzle is unable to be so located, it shall be on a line deviating not more than 30 degrees from the line normal to the center of the joint system. When so located its distance from the center of the joint system is to be less than 20 feet (6.1 m) by an amount equal to 1 foot (305 mm) for each 30 degrees of deviation from the normal (UL 2079).

Figure 12:
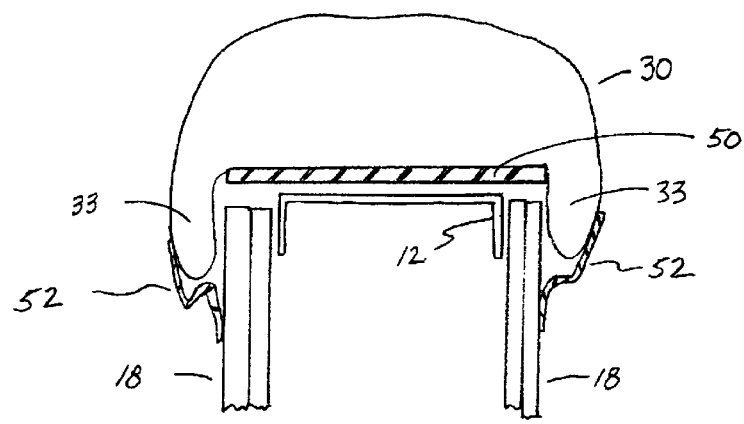
FIGS. 12–14 are other exemplary methods and barriers of the invention.
Figures 13, 14:
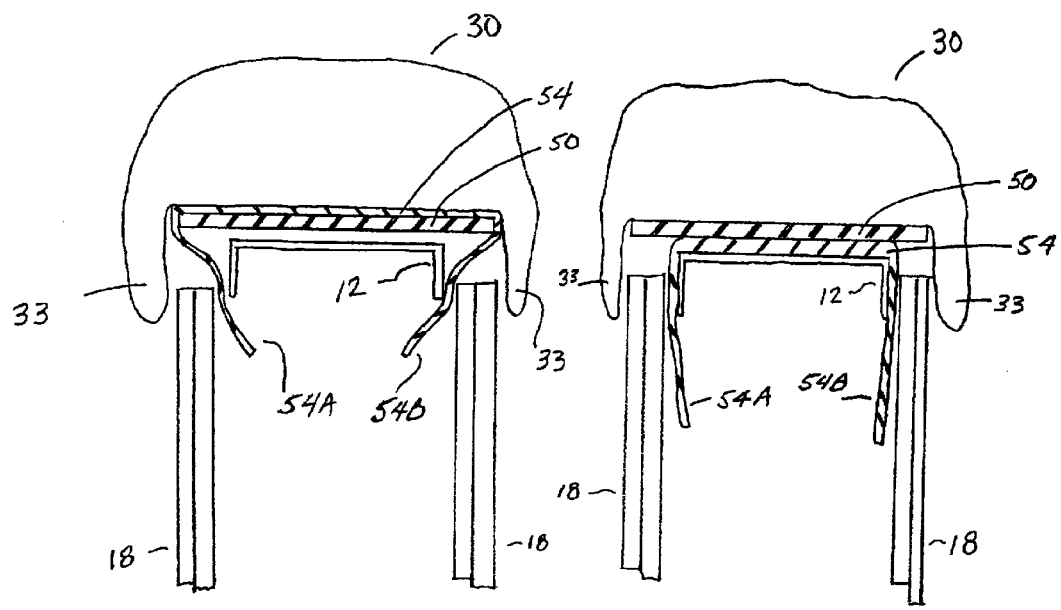

FIGS. 12–14 are cross-sectional plan views of further exemplary molding bag barrier assemblies, installed at the top of a wall, and located under a fluted metal ceiling (not shown).

As illustrated in FIG. 12, the molding bag 30 may be positioned over or adhered to a platform strip 50 which is operative to support the bag 30 such that, when filled, the bag 30 extends over and above the gypsum wall boards 18 and allows space for them to expand upwards towards the bag 30 (due to thermal cycling). The platform strip 50 may be constructed of any rigid material, such as for example a corrugated plastic sheet, preferably one in having corrugations aligned perpendicularly with respect to the length of the bag. Accordingly, a further exemplary method of the invention comprises attaching a longitudinal platform strip 30 to a horizontal track, before attaching the track to a ceiling. The platform strip 30 may have an adhesive layer on one or both sides to permit attachment of the bag 30 and/or horizontal track member 12, as well as to maintain their proper positioning relative to each other and to the track 12, during installation.

FIG. 12 also illustrates the use of sealing ribbons 52 to ensure a barrier seal between the lower portions 30 (or "ears") of the molding bag 30 and the gypsum boards 18. These sealing ribbons 52 may be made of tapes, having a strip material and adhesive layer, to permit the ribbons 52 to adhere intimately with the lower portions 33 of the bag 30 and the gypsum boards 18. These ribbons 52 prevent heat and smoke from penetrating through spaces between the boards 18, horizontal track member 12, platform strip 50, and/or molding bag 30. The ribbons 52 may be constructed from the same kind of materials used for making the bag 30 as described above. Adhesives used for attaching the ribbons 52 to the bag 30 and gypsum boards 18 are preferably chosen to resist degradation at high temperatures (e.g., which become tacky but do not degrade between 200–425° F. If the ribbons 52 are attached to the outward facing portion of the bag 30 (i.e., on a bag surface that faces away from the gypsum board face), then preferably a fold or extra material should preferably be used between the respective points of attachment on the bag 30 and gypsum board 18 to accommodate cycling movement (of the wall and gypsum boards 18). This is probably not necessary in situations wherein the ribbons 52 are installed on a surface of the lower bag portions 33 immediately facing against the gypsum board 18. Alternatively, one can spray an elastomeric material between the lower bag portions 33 and gypsum boards 18 to achieve a similar sealing purpose.

Accordingly, further exemplary methods of the invention comprise creating a barrier in a hole or joint cavity, as above-described, and further comprising attaching a ribbon to the bag and to at least one building structure, such as the wall (gypsum board) adjacent to said bag, so as to provide a further barrier to penetration by fire and/or smoke.

In a still further embodiment, illustrated in FIG. 13, a liner sheet 54 may be placed between the bag 30 and platform strip 50 (e.g., on top of the strip 50), and allowed to drape downwards whereby opposed liner sheet edges 54A and 54B reside between the horizontal track 12 and gypsum boards 18. The liner sheet 54 functions to provide an additional protection to penetration by heat or smoke at the top of the wall. Alternatively, as shown in FIG. 14, a liner sheet 54 may be placed between the horizontal track 12 and platform strip 50 to achieve the same purpose, and would be suited for situations wherein the platform strip 50 is pre-attached to the bag 30. It is contemplated that in further embodiments, the molding bag 30, platform strip 50, and liner sheet 54 may be attached to each other prior to being juxtaposed against or attached to the horizontal track 12.

The liner sheet 54, as well as platform strip 50, may be made of the same material as the molding bag 30. In further exemplary embodiments, all of these (sheet 54, strip 50, and bag 30) may also be constructed from carbon fiber, refractory ceramic fiber, fiber glass, calcium silica fiber, mineral wool, foil-covered fiberglass sheets, paper/fiberglass sheets, or similar materials, preferably of a high temperature resistant nature.

The present invention also provides a barrier assembly, examples of which are illustrated in FIGS. 13 and 14. Such an exemplary barrier assembly would comprise at least one barrier molding bag 30 and at least one liner sheet 54 and/or at least one support strip 50. In further exemplary barrier assemblies, the liner sheet 54 can be pre-attached between and to the bag 30 and support strip 50, as shown in FIG. 13; or, more preferably, the support strip 50 can be pre-attached between the bag 30 and support strip 50, as shown in FIG. 14. An optional adhesive layer (not shown) can be pre-attached to the support strip 50 and/or liner sheet 54 to facilitate fabrication or installation of the exemplary barrier assemblies illustrated in FIGS. 13 and 14.

If a liner sheet 54 is used (e.g., FIGS. 13 and 14), it is possible that the molding bag 30 can be used without the requiring the downward hanging flaps 33 (or "dog-ears") to protect the joint at the top of the drywall boards 18 where they meet the horizontal track 12. However, if the flaps or downward projections 33 are not employed, it would be preferable to pack mineral wool or other protective material in the small gap on top of the drywall boards 18 to provide further protection against head and fire (and also to permit cycling of the boards 18).

Figure 15:
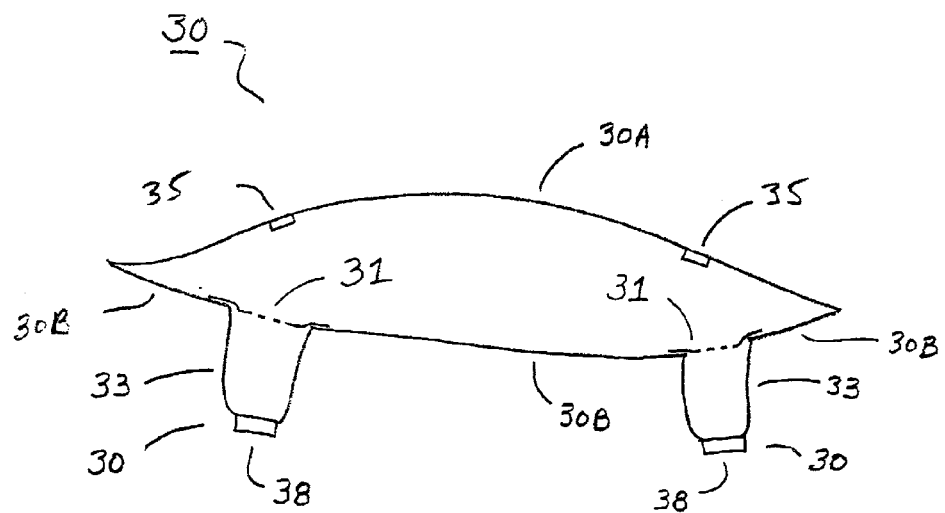
FIGS. 15 and 16 are illustrations of a further exemplary molding bag of the invention.

A still further exemplary molding bag of the invention is shown in the cross-sectional (transverse) view illustrated in FIG. 15. The molding bag 30 is constructed using a top sheet 30A which is preferably formed by sewing, adhering, melt-bonding, or otherwise attaching an elastic strip material 35 in a stretched mode to the sheet 30A, to provide folds, pleats, or crinkles (to permit expansion of the bag 30 when flowable firestop material is introduced); and a bottom sheet 30B. The top 30A and bottom 30B sheets may be adhered together at edge seams using adhesive, sewing, melt-bonding, or other means known.

Figure 16:
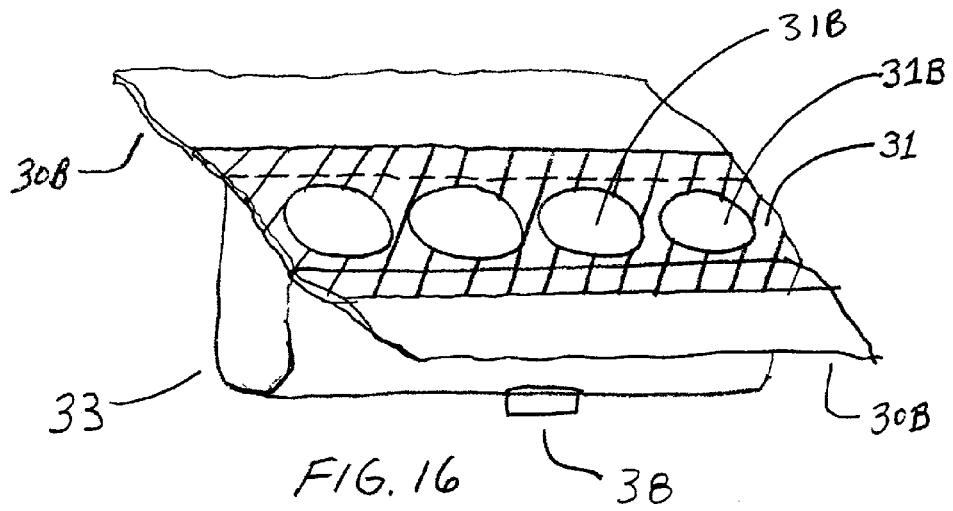

As seen in FIG. 15, an internal expansion restraint structure 31 is used to control the shape of the bag 30 when flowable firestop material is introduced into the bag. As more clearly seen in the perspective partial view illustrated in FIG. 16, an exemplary internal expansion restraint structure 31 may comprise a strip or "ribbon" of material having longitudinally extending opposed parallel edges that are adhered, welded, sewn, or otherwise attached to the bottom sheet 30B material. The internal expansion restraint structure 31 facilitates the shaping, when flowable firestop material is introduced into the bag, of the downward hanging flaps 33 or "dog-ears" used for protecting the horizontal track in a head-or-wall joint assembly. Valve 38 is shown at the bottom of the flaps 33 to permit flowable firestop material to be introduced into the bag 30. The internal expansion restraint structure 31 should preferably have performations, or, as more clearly shown in FIG. 16, large openings 31B (e.g., 1–3 cm) to permit the firestop material to flow from the flap portions 33 into the rest of the molding bag 30.

In further exemplary embodiments, the size of the portions of the internal expansion restraint structure 31 residing between the openings 31B may be selected so that they tear or rupture when a certain pressure (caused by introducing flowable firestop material into the bag 30) is reached. In other words, the portion of the internal expansion restraint structure 31 which resides between the openings 31B and the seamed or attached portions where the structure 31 contacts the bottom sheet 30B can be selected, in terms of size or thickness wall, to break or pull apart a predetermined pressure is reached inside the bag. Thus, for example, further exemplary bags and methods of the invention involve providing a bag structure that audibly and/or visually indicates (such as bursting of part of the wall of the internal expansion restraint structure 31) when the bag has been sufficiently filled. In cases where the internal expansion restraint structure 31 is made of plastic, the molding bag can provide both a visual and audible indication when high pressure is reached (meaning that the bag is sufficiently full) because a portion of the internal expansion restraint structure 31 will emit a loud "popping" or bursting sound, and the bag will consequently have a bulge at the place where the internal expansion restraint structure 31 has ruptured or broken.

In further exemplary embodiments, the top 30A and bottom 30B sheet portions of the molding bags, at an end of the bag, may not be directly seamed together at the bag end, but are instead seamed to an optional end-wall portion having one or more folds or pleats to permit the bag to expand in volume at the end of the bag. This feature is helpful when the end of the bag is located in a fluted metal deck cavity (ie. the cavity formed between the top ceiling portion and top of the wall), and especially so when the bag abuts the end of another bag in the cavity. Thus, an exemplary molding barrier bag of the invention comprises a first major sheet attached to a second major sheet, said barrier bag having at least one end at which said first and second major sheets are each attached to an end wall having at least one pleat or plurality of crinkles to permit expansion of said molding barrier bag at said at least one end.

Figure 17:
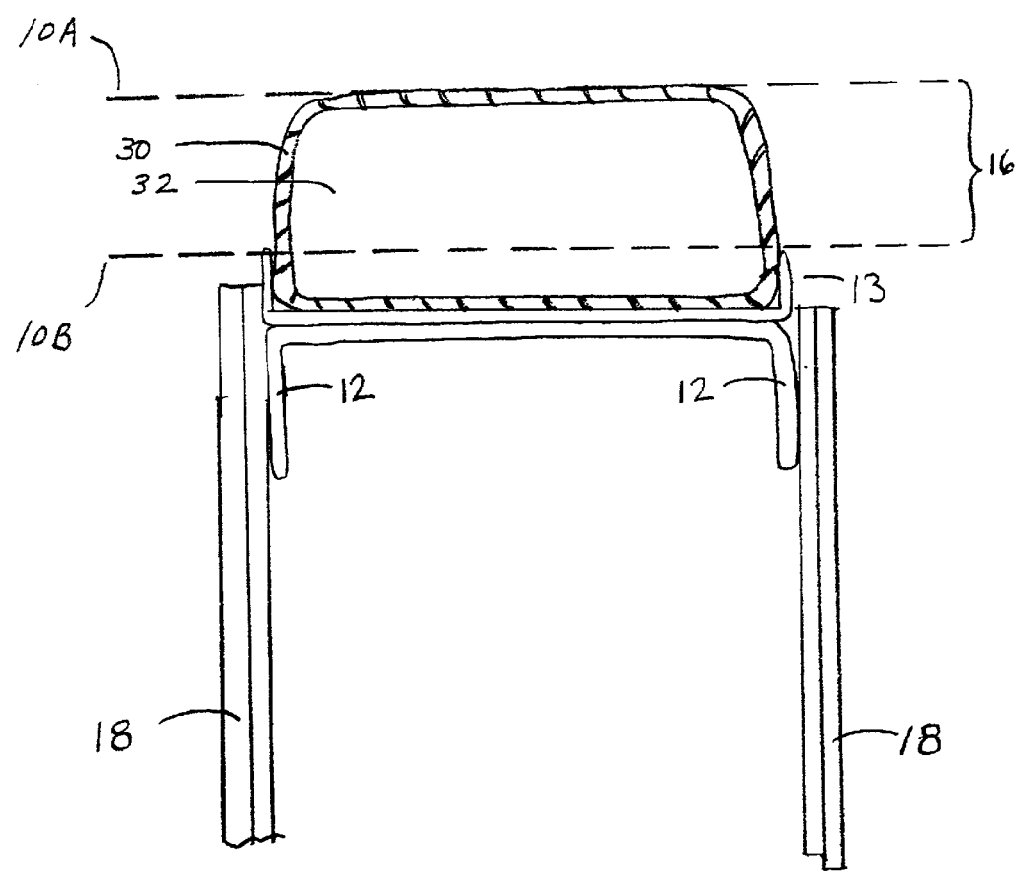
FIG. 17 is a cross-sectional illustration of a further exemplary bag barrier assembly of the invention.

FIG. 17 is a cross-sectional view of an exemplary method and barrier assembly, wherein a molding bag 30 is positioned in a "U" shaped track 13 which is then positioned against a fluted metal ceiling. The "U" shape confines expansion of the bag 30 against the top surface 10A of the fluted metal ceiling (16); allows firestop material 32 to flow beneath the bottom surface 10B of the ceiling; and prevents interference between bag 30 and wall boards 18. The "U" shaped track 13 and track 14 together form an "H" shape.

The foregoing discussion and examples are provided for illustrative purposes and not intended to limit the scope of the invention as claimed.

We claim:

1. A firestop molding bag, comprising: a first face, a second face, said first and second faces being connected to each other around peripheral edges thereby defining a bag enclosure for receiving a flowable fireproof ing material, at least one of said first and second faces having a plurality of holes or slits operative to release air pressure when said bag enclosure is filled with a flowable fireproofing material; said bag having a generally elongate body defined by a length dimension that exceeds a width dimension, at least one of said first and second faces having pleats or crinkles oriented perpendicularly with respect to said length dimension, said pleats or crinkles operative to permit expansion of the bag when flowable fireproofing material is introduced; said firestop molding bag further comprising an elastic band attached to said pleats or crinkles along said elongate body or further comprising a support strip attached to and extending along said elongate body.

2. The barrier molding bag of claim 1 wherein at least one of said first and second faces comprises a transparent plastic film, said bag further having at least one inlet for introducing into said bag a flowable fireproofing material.

3. The barrier molding bag of claim 1 wherein said bag has two opposed ends defining therebetween an elongated body, said elongated body having opposed longitudinally extending seams, and at least one inlet located along each of said opposed longitudinally extending seams to permit a flowable fireproofing material to be introduced into said bag.

4. The barrier molding bag of claim 1 having crinkles attached to said elastic band.

5. The barrier molding bag of claim 1 having a support strip extending along said elongated body.

6. The barrier molding bag of claim 1 having at least one end at which said faces are each attached to an end wall having at least one pleat or plurality of crinkles to permit expansion of said bag at said at least one end wall.

7. The barrier molding bag of claim 1 further comprising a liner sheet.

8. The barrier assembly of claim 7 wherein said bag, support strip, and liner sheet are attached together as an integral unit.

9. The barrier assembly of claim 8 wherein said support strip is attached between said bag and liner sheet.

10. The barrier molding bag of claim 1 further having firestop material.

11. The barrier molding bag of claim 10 wherein said firestop material is Portland cement, gypsum, or mixture thereof.

12. The barrier molding bag of claim 11 wherein said firestop material further comprises at least one admixture selected from set accelerators, set retarders, water reducers, superplasticizers, fluidity enhancing agents, rheology modifiers, air entraining agents, pigments or colorants, aggregates, fibers, rheopectic agents, surfactants, antibacterial agents, or mixture thereof.

13. The barrier molding bag of claim 10 wherein said firestop material comprises an intumescent material.

14. The barrier molding bag of claim 10 wherein said firestop material comprises a superabsorbent polymer, a desiccant, hydrated silica gel, or mixture thereof.

15. The barrier molding bag of claim 1, wherein said bag is made of a transparent plastic film and has at least one inlet having a flap member for allowing flowable firestop material to flow into said molding bag.

16. The barrier molding bag of claim 11 wherein said firestop material is hardened and has a fire endurance, when tested in accordance with UL 2079, of at least 60 minutes.

17. The barrier of claim 11, wherein said molding bag contains hardened firestop material capable of avoiding failure when subjected to a hose stream test in accordance with UL 2079 in at least one of the hourly fire rating times indicated below:

| Hourly fire rating time, minutes | Water pressure at base of nozzle, Psi | (kPa) | Duration of application, seconds per square foot (s/m$^2$) of exposed area[a] | |
|---|---|---|---|---|
| 240 · time < 480 | 45 | (310) | 3.0 | (32) |
| 120 · time < 240 | 30 | (210) | 1.5 | (16) |
| 90 · time < 120 | 30 | (210) | 0.90 | (9.7) |
| time < 90 | 30 | (210) | 0.60 | (6.5) |

[a]The rectangular area of the structure in which the joint system is mounted is to be considered as the exposed area, as the hose stream must traverse this calculated area during application.

18. The firestop molding bag of claim 1 being located in a head-of-wall joint between a fluted metal ceiling and metal stud assembly.

19. The firestop molding bag of claim 1 being located within a "U" shaped track.

20. The firestop molding bag of claim 19 containing hardened Portland cement, gypsum, or a mixture thereof.

21. A firestop molding bag, comprising:

a first face made of transparent plastic film, a second face made of transparent plastic film, said first and second plastic film faces being connected to each other around peripheral opposite edges and opposing ends, thereby defining a bag enclosure having a generally elongate tube body defined by a length dimension that exceeds a width dimension;

said first face of said bag having a series of pleats extending along said generally elongate tube body and arranged perpendicularly with respect to said length dimension, said first face further comprising a plurality of holes or slits for evacuating air when said bag is filled with a flowable firestop material; and said second face of said bag having at least one inlet valve for introducing a flowable firestop material into said bag and further having at least one flap member resiliently biased in a closed position against said at least one inlet valve, said flap member operative to permit firestop material to be introduced into said bag and to seal said inlet valve.

22. The firestop molding bag of claim 21 wherein said at least one inlet valve is located in the center between opposite edges of bag second face.

23. The firestop molding bag of claim 21 wherein said bag is located in a "U" shaped track.

24. The firestop molding bag of claim 23 wherein said bag contains a firestop material.

25. The firestop molding bag of claim 24 wherein said firestop material is Portland cement, gypsum, or a mixture thereof.

26. The barrier molding bag of claim 25 wherein said firestop further comprises at least one admixture selected from set accelerators, set retarders, water reducers, superplasticizers, fluidity enhancing agents, rheology modifiers, air entraining agents, pigments or colorants, aggregates, fibers, rheopectic agents, surfactants, antibacterial agents, or mixture thereof.

27. The barrier molding bag of claim 25 wherein said is firestop material is hardened and has a fire endurance, when tested in accordance with UL 2079, of at least 60 minutes.

28. The barrier molding bag of claim 25 wherein said molding bag contains hardened firestop material capable of avoiding failure when subjected to a hose stream test in accordance with UL 2079 in at least one of the hourly fire rating times indicated below:

| Hourly fire rating time, minutes | Water pressure at base of nozzle, Psi | (kPa) | Duration of application, seconds per square foot (s/m$^2$) of exposed area[a] | |
|---|---|---|---|---|
| 240 · time < 480 | 45 | (310) | 3.0 | (32) |
| 120 · time < 240 | 30 | (210) | 1.5 | (16) |
| 90 · time < 120 | 30 | (210) | 0.90 | (9.7) |
| time < 90 | 30 | (210) | 0.60 | (6.5) |

[a]The rectangular area of the structure in which the joint system is mounted is to be considered as the exposed area, as the hose stream must traverse this calculated area during application.

29. The barrier molding bag of claim 25 being located in a head-of-wall joint between fluted metal ceiling and metal stud assembly.

* * * * *